US008892768B2

(12) United States Patent
Amemiya et al.

(10) Patent No.: US 8,892,768 B2
(45) Date of Patent: Nov. 18, 2014

(54) LOAD BALANCING APPARATUS AND LOAD BALANCING METHOD

(75) Inventors: Kouichirou Amemiya, Kawasaki (JP); Kazumine Matoba, Kawasaki (JP); Masaaki Takase, Kawasaki (JP); Kenichi Abiru, Kawasaki (JP); Hitoshi Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 12/853,330

(22) Filed: Aug. 10, 2010

(65) Prior Publication Data

US 2011/0040892 A1 Feb. 17, 2011

(30) Foreign Application Priority Data

Aug. 11, 2009 (JP) ................. 2009-186699

(51) Int. Cl.
*G06F 15/16* (2006.01)
*H04L 12/56* (2006.01)
*H04L 29/08* (2006.01)

(52) U.S. Cl.
CPC ................ *H04L 67/1027* (2013.01)
USPC .......... 709/238; 709/218; 709/235; 370/392; 370/400

(58) Field of Classification Search
USPC ................. 709/201–206, 218, 224–226, 235, 709/238–239, 245; 370/235, 238, 351, 382, 370/400–401
See application file for complete search history.

(56) References Cited

U.S. PATENT DOCUMENTS

2005/0060427 A1* 3/2005 Phillips et al. ............... 709/238
2005/0198335 A1* 9/2005 Brown et al. ................. 709/229
2007/0192492 A1* 8/2007 Okazaki ....................... 709/226
2008/0031496 A1 2/2008 Takagi
2008/0080517 A1* 4/2008 Roy et al. .................. 370/395.5
2008/0247678 A1 10/2008 Okamoto et al.
2010/0057919 A1* 3/2010 Leitheiser et al. ............ 709/228
2010/0265824 A1* 10/2010 Chao et al. .................... 370/235

FOREIGN PATENT DOCUMENTS

| JP | 2005-057487 | 3/2005 |
| JP | 2006-174374 | 6/2006 |
| JP | 2008-040763 A | 2/2008 |
| JP | 2008-259114 A | 10/2008 |

OTHER PUBLICATIONS

"Japanese Office Action" mailed by JPO and corresponding to Japanese application No. 2009-186699 on Feb. 26, 2013, with English translation.

* cited by examiner

*Primary Examiner* — Yasin Barqadle
(74) *Attorney, Agent, or Firm* — Fujitsu Patent Center

(57) ABSTRACT

A load balancing apparatus stores a transfer rule in which a path control identifier for identifying a path for a message sent from a client device is associated with relay device information for specifying a relay device that creates the path control identifier. When receiving a message from the client device, the load balancing apparatus determines whether the message contains the path control identifier. If the load balancing apparatus determines that the path control identifier is contained, the load balancing apparatus specifies, from the transfer rule, relay device information with which the path control identifier is associated and then sends the message to a relay device that is specified by the specified relay device information. In contrast, if the load balancing apparatus determines that the path control identifier is not contained, the load balancing apparatus sends the message to the relay device specified in accordance with a predetermined condition.

8 Claims, 34 Drawing Sheets

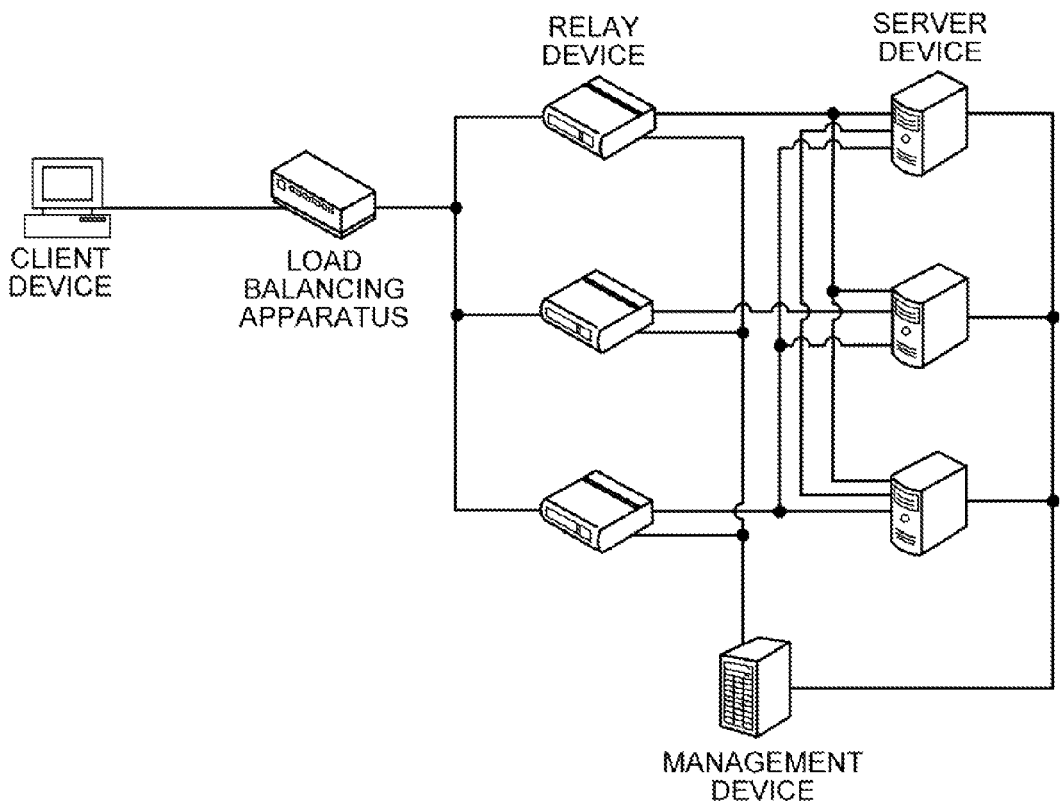

FIG.4A

| ARP TABLE 3 | |
|---|---|
| IP | MAC |
| IP-SVR | MAC-SLB |
| IP-SLB | MAC-SLB |
| IP-CL | MAC-SLB |

FIG.4B

[NETWORK SETTING]
IP: IP-MSG
MAC: MAC-MSG

FIG.5

| CONNECTION TABLE (TABLE (0-7)) ||
|---|---|
| CLIENT-SIDE CONNECTION | SERVER-SIDE CONNECTION |
| IP-CL: Port#1, IP-MSG: Port#2 | IP-MSG: Port#3, IP-SVR: Port#2 |

FIG.6A

| ARP TABLE 4 | |
|---|---|
| IP | MAC |
| IP-MSG | MAC-MSG |

FIG.6B

[NETWORK SETTING]
IP: IP-SVR
MAC: MAC-SVR

| DESTINATION | COOKIE |
|---|---|
| 192.168.1.1 | K00000 |
| xxx.url | Kaaaaa |
| ... | ... |

| DESTINATION | APPLICATION SESSION IDENTIFIER |
|---|---|
| 192.168.1.1 | S00000 |
| xxx.url | S11111 |
| ... | ... |

| SESSION IDENTIFIER | IP ADDRESS OF TRANSFER DESTINATION SERVER |
|---|---|
| S00001 | 1.1.1.1 |
| S11111 | 1.1.1.2 |
| ... | ... |

| IP ADDRESSES OF SERVER |
|---|
| 1.1.1.1 |
| 1.1.1.2 |
| ... |

| CLIENT-SIDE CONNECTION | SERVER-SIDE CONNECTION |
|---|---|
| SOURCE IP: PORT, DESTINATION IP: PORT | SOURCE IP: PORT, DESTINATION IP: PORT |
| ... | ... |

| SESSION IDENTIFIER | SESSION DATA |
|---|---|
| S00001 | XXXX |
| S11111 | YYYY |

FIG.23

| L2 HEADER | SOURCE MAC | MAC ADDRESS OF CLIENT DEVICE |
|---|---|---|
| | DESTINATION MAC | MAC ADDRESS OF LOAD BALANCING APPARATUS |
| PACKET HEADER (L3/L4) | SOURCE IP: PORT | SOURCE IP ADDRESS AND PORT NUMBER OF CLIENT DEVICE |
| | DESTINATION IP: PORT | IP ADDRESS AND PORT NUMBER ASSIGNED TO LOAD BALANCING APPARATUS |
| PROTOCOL HEADER | | |
| MESSAGE CONTENT PORTION | DATA | DATA MAIN BODY SENT AS MESSAGE |

FIG.24

| L2 HEADER | SOURCE MAC | MAC ADDRESS OF CLIENT DEVICE |
|---|---|---|
| | DESTINATION MAC | MAC ADDRESS OF LOAD BALANCING APPARATUS |
| PACKET HEADER (L3/L4) | SOURCE IP: PORT | SOURCE IP ADDRESS AND PORT NUMBER OF CLIENT DEVICE |
| | DESTINATION IP: PORT | IP ADDRESS AND PORT NUMBER ASSIGNED TO LOAD BALANCING APPARATUS |
| PROTOCOL HEADER | PATH CONTROL IDENTIFIER | IDENTIFIER FOR SPECIFYING RELAY DEVICE TO BE USED |
| MESSAGE CONTENT PORTION | SESSION IDENTIFIER | SESSION IDENTIFIER FOR SERVER DEVICE |
| | DATA | DATA MAIN BODY SENT AS MESSAGE |

FIG.26

| L2 HEADER | SOURCE MAC | MAC ADDRESS OF LOAD BALANCING APPARATUS |
|---|---|---|
| | DESTINATION MAC | MAC ADDRESS OF RELAY DEVICE |
| PACKET HEADER (L3: L4) | SOURCE IP: PORT | SOURCE IP ADDRESS AND PORT NUMBER OF CLIENT DEVICE |
| | DESTINATION IP: PORT | IP ADDRESS AND PORT NUMBER ASSIGNED TO RELAY DEVICE |
| PROTOCOL HEADER | PATH CONTROL IDENTIFIER | IDENTIFIER FOR SPECIFYING RELAY DEVICE TO BE USED |
| MESSAGE CONTENT PORTION | SESSION IDENTIFIER | SESSION IDENTIFIER FOR SERVER DEVICE |
| | DATA | DATA MAIN BODY SENT AS MESSAGE |

FIG.27

| L2 HEADER | SOURCE MAC | MAC ADDRESS OF LOAD BALANCING APPARATUS |
|---|---|---|
| | DESTINATION MAC | MAC ADDRESS OF RELAY DEVICE |
| PACKET HEADER (L3/L4) | SOURCE IP: PORT | SOURCE IP ADDRESS AND PORT NUMBER OF CLIENT DEVICE |
| | DESTINATION IP: PORT | IP ADDRESS AND PORT NUMBER ASSIGNED TO RELAY DEVICE |
| PROTOCOL HEADER | | |
| MESSAGE CONTENT PORTION | DATA | DATA MAIN BODY SENT AS MESSAGE |

FIG.29

| L2 HEADER | SOURCE MAC | MAC ADDRESS OF RELAY DEVICE |
|---|---|---|
| | DESTINATION MAC | MAC ADDRESS OF SERVER DEVICE |
| PACKET HEADER (L3/L4) | SOURCE IP: PORT | IP: PORT OF RELAY DEVICE |
| | DESTINATION IP: PORT | IP: PORT OF SERVER DEVICE |
| PROTOCOL HEADER | PATH CONTROL IDENTIFIER | IDENTIFIER FOR SPECIFYING RELAY DEVICE TO BE USED |
| MESSAGE CONTENT PORTION | SESSION IDENTIFIER | SESSION IDENTIFIER FOR SERVER DEVICE |
| | DATA | DATA MAIN BODY SENT AS MESSAGE |

FIG.30

| L2 HEADER | SOURCE MAC | MAC ADDRESS OF RELAY DEVICE |
|---|---|---|
| | DESTINATION MAC | MAC ADDRESS OF SERVER DEVICE |
| PACKET HEADER (L3/L4) | SOURCE IP: PORT | IP: PORT OF RELAY DEVICE |
| | DESTINATION IP: PORT | IP: PORT OF SERVER DEVICE |
| PROTOCOL HEADER | | |
| MESSAGE CONTENT PORTION | DATA | DATA MAIN BODY SENT AS MESSAGE |

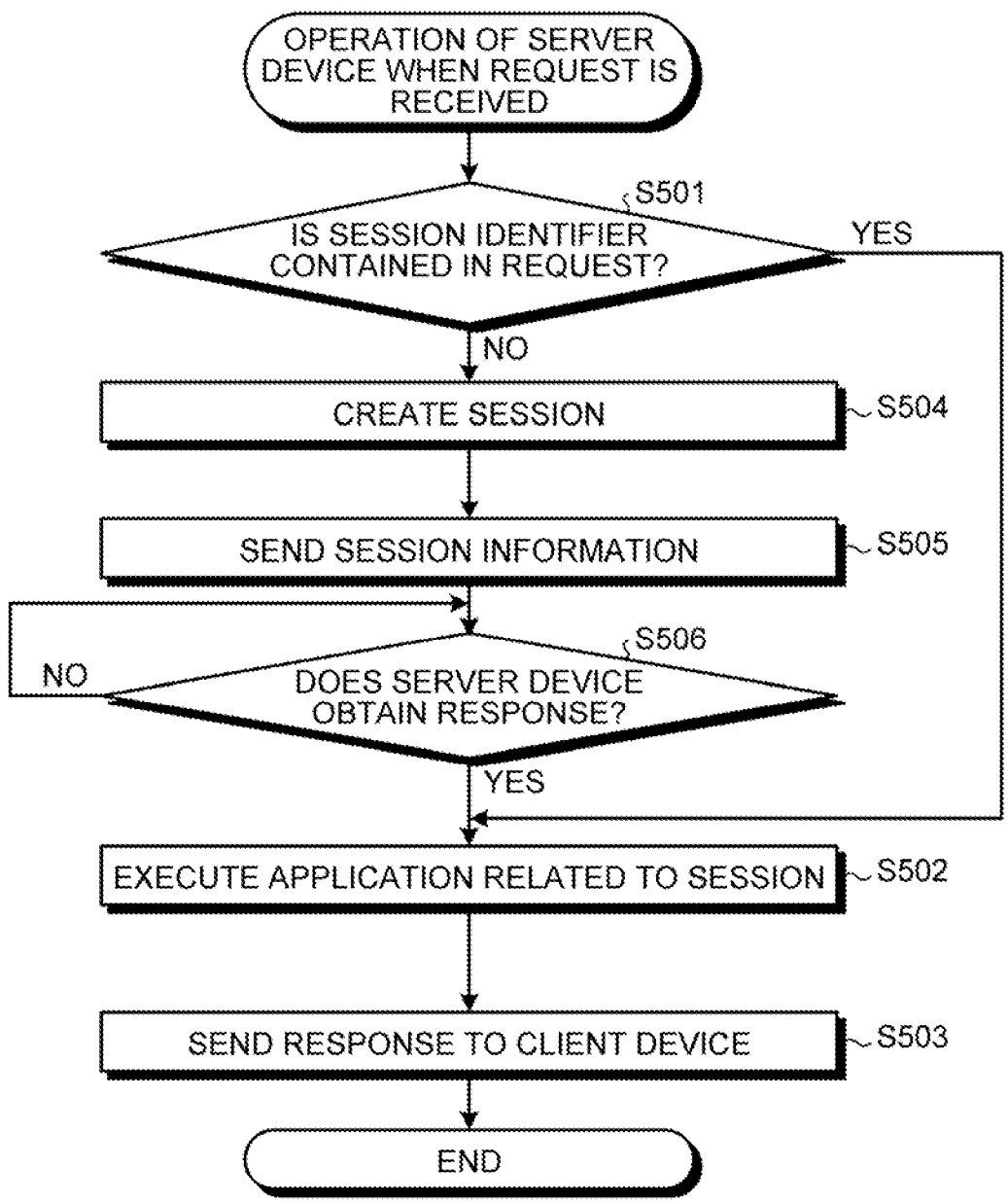

FIG.32

| L2 HEADER | SOURCE MAC | MAC ADDRESS OF SERVER DEVICE |
|---|---|---|
| | DESTINATION MAC | MAC ADDRESS OF RELAY DEVICE |
| PACKET HEADER (L3/L4) | SOURCE IP: PORT | IP: PORT OF SERVER DEVICE |
| | DESTINATION IP: PORT | IP: PORT OF RELAY DEVICE |
| PROTOCOL HEADER | | |
| MESSAGE CONTENT PORTION | SESSION IDENTIFIER | IDENTIFIER FOR SPECIFYING SESSION FOR SERVER DEVICE |
| | DATA | DATA MAIN BODY SENT AS MESSAGE |

FIG.34

| SESSION IDENTIFIER | IDENTIFIER FOR UNIQUELY SPECIFYING SESSION |
|---|---|
| SESSION RETAINING SERVER ADDRESS | IP ADDRESS OF SERVER DEVICE THAT CREATES SESSION IDENTIFIER |
| ADDRESS OF MESSAGE RELAY DEVICE | IP ADDRESS OF RELAY DEVICE THAT PROCESSES REQUEST |

FIG.35

| MESSAGE RELAY DEVICE FOR SETTING DESTINATION | IP ADDRESS OF RELAY DEVICE FOR SETTING DESTINATION OF TRANSFER RULE |
|---|---|
| SESSION IDENTIFIER | IDENTIFIER FOR UNIQUELY SPECIFYING SESSION |

FIG.36

| SETTING DESTINATION ADDRESS | | IP ADDRESS OF MESSAGE RELAY DEVICE FOR SETTING DESTINATION OF TRANSFER RULE |
|---|---|---|
| TRANSFER RULE | SESSION IDENTIFIER | IDENTIFIER FOR UNIQUELY SPECIFYING SESSION |
| | SETTING DESTINATION SERVER ADDRESS | IP ADDRESS OF SERVER DEVICE TO WHICH MESSAGE SENT TO SESSION IS TRANSFERRED |

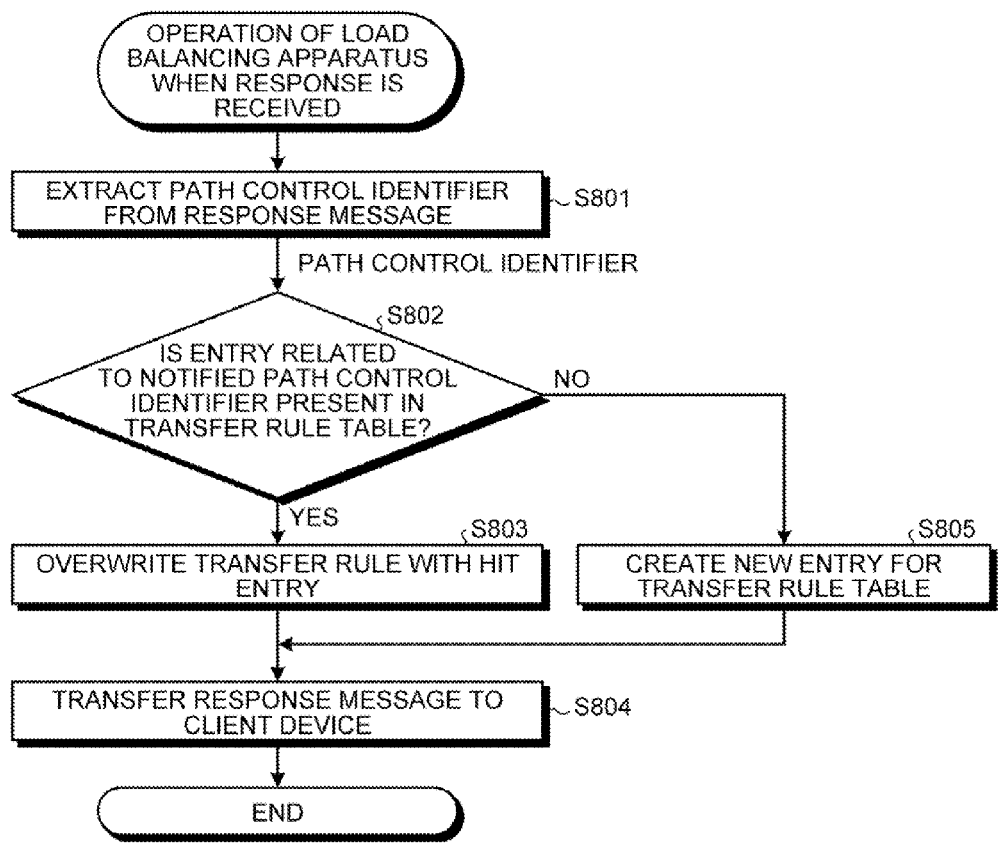

FIG.41

| L2 HEADER | SOURCE MAC | MAC ADDRESS OF LOAD BALANCING APPARATUS |
| --- | --- | --- |
| | DESTINATION MAC | MAC ADDRESS OF CLIENT DEVICE |
| PACKET HEADER (L3/L4) | SOURCE IP: PORT | IP: PORT OF LOAD BALANCING APPARATUS |
| | DESTINATION IP: PORT | IP: PORT OF CLIENT DEVICE |
| PROTOCOL HEADER | PATH CONTROL IDENTIFIER | IDENTIFIER FOR SPECIFYING RELAY DEVICE TO BE USED |
| MESSAGE CONTENT PORTION | SESSION IDENTIFIER | SESSION IDENTIFIER FOR SERVER DEVICE |
| | DATA | DATA MAIN BODY SENT AS MESSAGE |

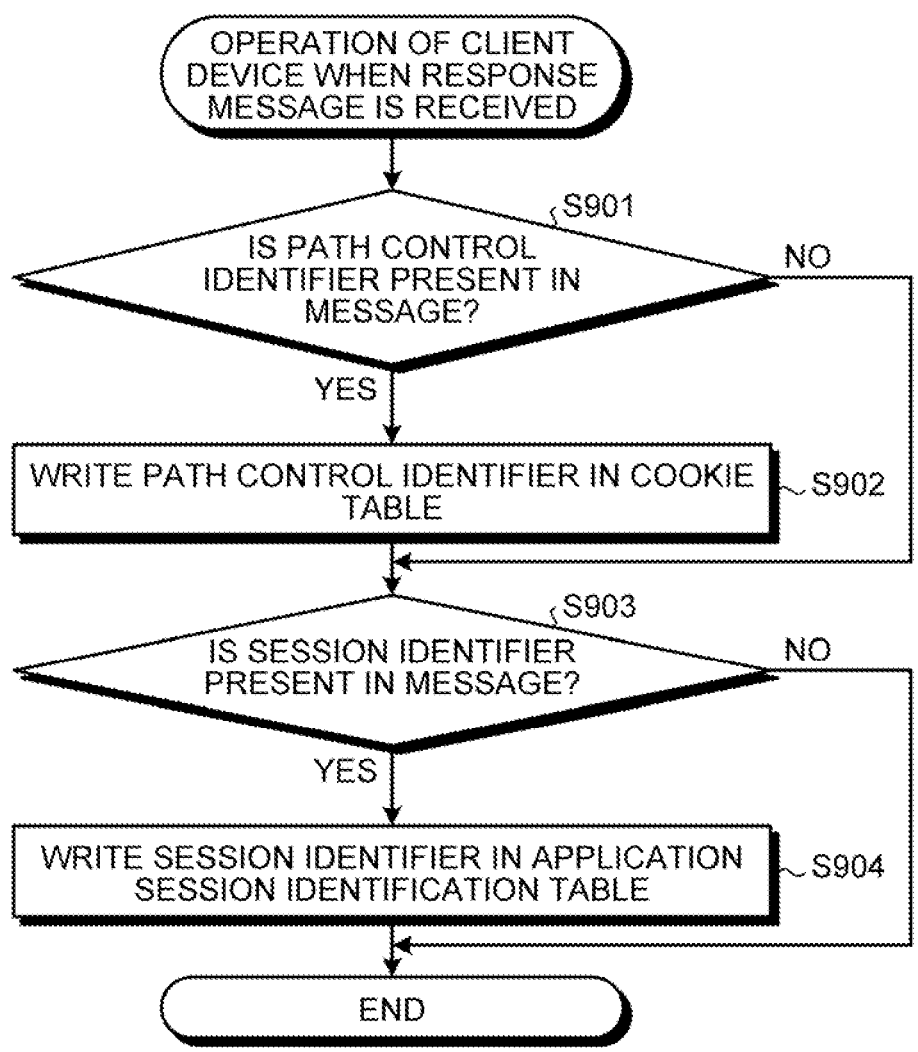

| SESSION IDENTIFIER | PATH CONTROL IDENTIFIER |
|---|---|
| S00001 | K00001 |
| S00002 | Kaaaaa |

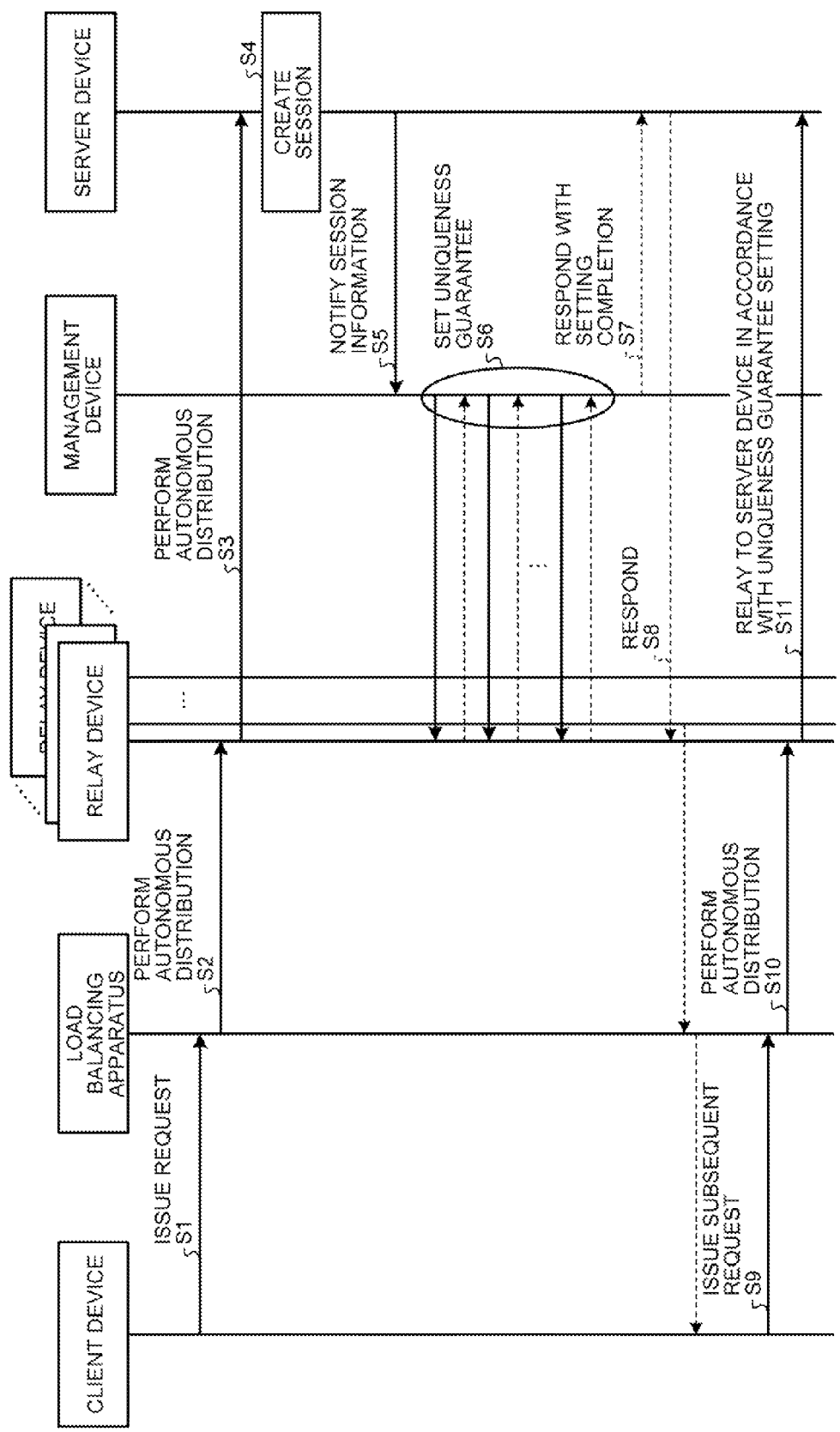

LOAD BALANCING APPARATUS AND LOAD BALANCING METHOD

CROSS-REFERENCE TO RELATED APPLICATION(S)

This application is based upon and claims the benefit of priority of the prior Japanese Patent Application No. 2009-186699, filed on Aug. 11, 2009, the entire contents of which are incorporated herein by reference.

FIELD

The embodiments discussed herein are directed to a load balancing apparatus and a load balancing method.

BACKGROUND

Load balancing apparatuses are used to balance processes by balancing loads between a plurality of servers that provide services to client terminals. The load balancing apparatuses distributes, to servers in accordance with an autonomous distributed algorithm such as a round robin algorithm, access such as message requests received from the client terminal.

The load balancing apparatuses guarantees uniqueness when they distribute loads to web servers that use a hypertext transfer protocol (HTTP) in which a session, such as a session accessing a shopping site, needs to be retained. The term "uniqueness guarantee" means that request messages belonging to the same browsing sessions are guaranteed to be distributed to the corresponding servers.

In the following, an explanation will be given as an example, with reference to FIG. 51, of the guarantee uniqueness performed by a load balancing apparatus in which an HTTP is used. When the load balancing apparatus receives a first HTTP message from a client, the load balancing apparatus assigns a distribution destination server device. The server that receives the HTTP message creates a session identifier that identifies a session. Then, the load balancing apparatus associates the assigned destination with the session identifier that is created in the server and then stores it as a transfer rule table.

Thereafter, if the load balancing apparatus receives a request containing the session identifier from the client (see (1) in FIG. 51), the load balancing apparatus specifies, from the transfer rule table in accordance with the session identifier, the distribution destination and sends the request to the distribution destination (see (2) in FIG. 51). If the load balancing apparatus receives a reply to the request from the distribution destination server device (see (3) in FIG. 51), the load balancing apparatus sends a reply to the client that is a request source (see (4) in FIG. 51). In this way, during the session, requests from the same client are distributed to the corresponding server.

In recent years, in a service-oriented architecture (SOA), the simple object access protocol (SOAP) is used to implement a high-performance Web service function using a Web interface. As illustrated in FIG. 52, a SOAP message has a layer 3 protocol header, a layer 4 protocol header, a layer 7 protocol header, and a message content portion. In the layer 3 protocol header, a protocol number or the like is described. In the layer 4 protocol header, a port number or the like is described. In the layer 7 protocol header, a cookie or the like is described. In a message content portion, which is a header body of the SOAP, because control information that provides a SOAP function is described, in some cases, a session identifier that is used to guarantee uniqueness is described.

Load balancing apparatuses perform load balancing by referring to the layer 3 protocol header, the layer 4 protocol header, and the layer 7 protocol header. However, when a SOAP is used, a device capable of referring to message content has to be used. Thus, in recent years, a system is used that is used by a message relay device, which is arranged between the load balancing apparatus and servers serving as distribution destinations and which distributes requests to the servers by referring message content portions. Such a conventional load balancing apparatus is disclosed in for example Japanese Laid-open Patent Publication No. 2008-40763.

However, because the format of the message content portion depends on the application and differs for each message, if the message relay device refers to the content of the message content portion every time when it receives a message, the processing load becomes extremely high. Accordingly, there is a problem with degradation of the response performance with respect to clients.

As described above, there is a high possibility that the message relay device becomes a bottleneck in the system. To solve this, a method of arranging message relay devices in parallel and performing load balancing has been conceived; however, with this method, it is necessary to guarantee uniqueness. Specifically, as illustrated in FIG. 53, it is conceivable to use a system in which a client device is connected to a load balancing apparatus, and two or more message relay devices are arranged between the load balancing apparatus and two or more servers.

The client device illustrated in FIG. 53 is a device that uses services provided by servers. Each server creates a unique state of a user, such as session information, and sends an identifier that specifies the state by containing the state in a message content portion. The load balancing apparatus sends, to a message relay device in accordance with an autonomous distributed algorithm, a message received from the client device. A management device collects, from a server, a session identifier and an IP address of the server that holds the session identifier, creates a transfer rule in which the session identifier is associated with the IP address and which is information for guaranteeing uniqueness, and distributes the transfer rule to each message relay device. By referring to the session identifier from the message content portion of the message that is sent from the load balancing apparatus, each message relay device relays, in accordance with the transfer rule, the message to the target server. If there is no transfer rule, each message relay device sends a message to a server in accordance with an autonomous distributed algorithm.

In the following, a processing sequence performed by a system illustrated in FIG. 53 will be described with reference to FIG. 54. As illustrated in FIG. 54, the client device issues, to the load balancing apparatus, a request (Step S1). The load balancing apparatus sends, in accordance with an autonomous distributed algorithm, the request to one of the message relay devices (Step S2). Subsequently, the message relay device that receives the request sends, in accordance with the autonomous distributed algorithm, the request to one of the servers (Step S3). The server that receives the request creates session information (session identifier) and sends it to the management device (Steps S4 and S5).

The management device creates a guarantee-of-uniqueness setting (transfer rule) in which the received session identifier is associated with the IP address of the server that receives the request and then sends it to all of the message relay devices (Step S6). Then, the management device notifies the server that creates the session identifier that the uniqueness guarantee setting is set in all of the message relay devices (Step S7). The server that receives the uniqueness guarantee setting replies to the client device (Step S8).

Thereafter, in the same session, if the client device issues a subsequent request to the load balancing apparatus (Step S9), the load balancing apparatus sends, in accordance with the autonomous distributed algorithm, the request to a message relay device (Step S10). Subsequently, the message relay device that receives the request relays, in accordance with the guarantee-of-uniqueness setting (transfer rule) held by the management device, the request to the corresponding server (Step S11). In this way, it is possible to guarantee uniqueness while performing load balancing by arranging the message relay devices in parallel.

However, with this method, the management device needs to distribute the transfer rule to all of the message relay devices. Furthermore, to reliably send the message to the appropriate server, processing needs to be continued after checking that settings for all of the message relay devices have been completed. Accordingly, the number of times the transfer rule is set increases, and a standby state is continued until all of the message relay device complete the setting, thus degrading response performance with respect to the client.

SUMMARY

According to an aspect of an embodiment of the invention, a load balancing apparatus includes a rule storing unit that stores therein a load balancing apparatus transfer rule in which a path control identifier for identifying a path for a message sent from a client device is associated with relay device information for specifying a relay device that creates the path control identifier; an identifier determining unit that determines, when a message is received from the client device, whether the path control identifier is contained in the message; a first distribution unit that specifies, when the identifier determining unit determines that the path control identifier is contained, relay device information that is associated with the path control identifier from the load balancing apparatus transfer rule stored in the rule storing unit and then sends the message to a relay device that is specified by the specified relay device information; and a second distribution unit that sends, when the identifier determining unit determines that the path control identifier is not contained, the message to a specified relay device in accordance with a predetermined condition.

According to another aspect of the present invention, a load balancing apparatus includes a storing unit that stores therein a load balancing apparatus transfer rule in which a path control identifier for identifying a path for a message sent from a client device is associated with relay device information for specifying a relay device that creates the path control identifier, and a processor executing an operation. The operation includes determining, when a message is received from the client device, whether the path control identifier is contained in the message, specifying, when the identifier determining unit determines that the path control identifier is contained, relay device information that is associated with the path control identifier from the load balancing apparatus transfer rule stored in the rule storing unit and then sends the message to a relay device that is specified by the specified relay device information, and sending, when the identifier determining unit determines that the path control identifier is not contained, the message to a specified relay device in accordance with a predetermined condition.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a schematic diagram illustrating the overall configuration of a system including a load balancing apparatus according to a first embodiment;

FIG. 2A is a schematic diagram illustrating an ARP table held by a client device;

FIG. 2B is a schematic diagram illustrating the network configuration of the client device;

FIG. 3A is a schematic diagram illustrating an ARP table held by a load balancing apparatus;

FIG. 3B is a schematic diagram illustrating the network configuration of the load balancing apparatus;

FIG. 4A is a schematic diagram illustrating an ARP table held by a relay device;

FIG. 4B is a schematic diagram illustrating the network configuration of the relay device;

FIG. 5 is a schematic diagram illustrating a connection table held by the relay device;

FIG. 6A is a schematic diagram illustrating an ARP table held by each server device;

FIG. 6B is a schematic diagram illustrating the network configuration of each server device;

FIG. 7 is a block diagram illustrating the configuration of the client device;

FIG. 8 is a schematic diagram illustrating an example of information held by a cookie table 12a;

FIG. 9 is a schematic diagram illustrating an example of information held by an application session identification table 12b;

FIG. 10 is a block diagram illustrating the configuration of the load balancing apparatus;

FIG. 11 is a schematic diagram illustrating an example of information stored in a relay device list table 22a;

FIG. 12 is a schematic diagram illustrating an example of information stored in a transfer rule table 22b;

FIG. 13 is a block diagram illustrating the configuration of the relay device;

FIG. 14 is a schematic diagram illustrating an example of information stored in a transfer rule table 32a;

FIG. 15 is a schematic diagram illustrating an example of information stored in a server list table 32b;

FIG. 18 is a schematic diagram illustrating an example of information stored in a session table 42a;

FIG. 19 is a block diagram illustrating the configuration of a management device;

FIG. 23 is a schematic diagram illustrating an example of a message exhibited until a session is established;

FIG. 24 is a schematic diagram illustrating an example of a message exhibited after session establishment;

FIG. 26 is a schematic diagram illustrating an example of a message sent to the relay device after session establishment;

FIG. 27 is a schematic diagram illustrating an example of a message sent to the relay device before session establishment;

FIG. 29 is a schematic diagram illustrating an example of a message sent to the server device after session establishment;

FIG. 30 is a schematic diagram illustrating an example of a message sent to the server device before session establishment;

FIG. 31 is a flowchart illustrating the operation of the server device when a request is received;

FIG. 32 is a schematic diagram illustrating an example of a message sent from the server device to the relay device after session establishment;

FIG. 34 is a schematic diagram illustrating an example of session information received by a management device 50;

FIG. 35 is a schematic diagram illustrating an example of a transfer rule created by the management device 50;

FIG. 36 is a schematic diagram illustrating an example of the transfer rule distributed by the management device 50;

FIG. 39 is a schematic diagram illustrating an example of a message sent from the relay device to the load balancing apparatus after session establishment;

FIG. 40 is a flowchart illustrating the operation of the load balancing apparatus when a response is received;

FIG. 41 is a schematic diagram illustrating an example of a message sent from the load balancing apparatus to the client device after session establishment;

FIG. 42 is a flowchart illustrating the operation of the client device when a response is received;

FIG. 54 is a schematic diagram illustrating a processing sequence of the conventional technology.

DESCRIPTION OF EMBODIMENT(S)

Figures 7, 8, 9:
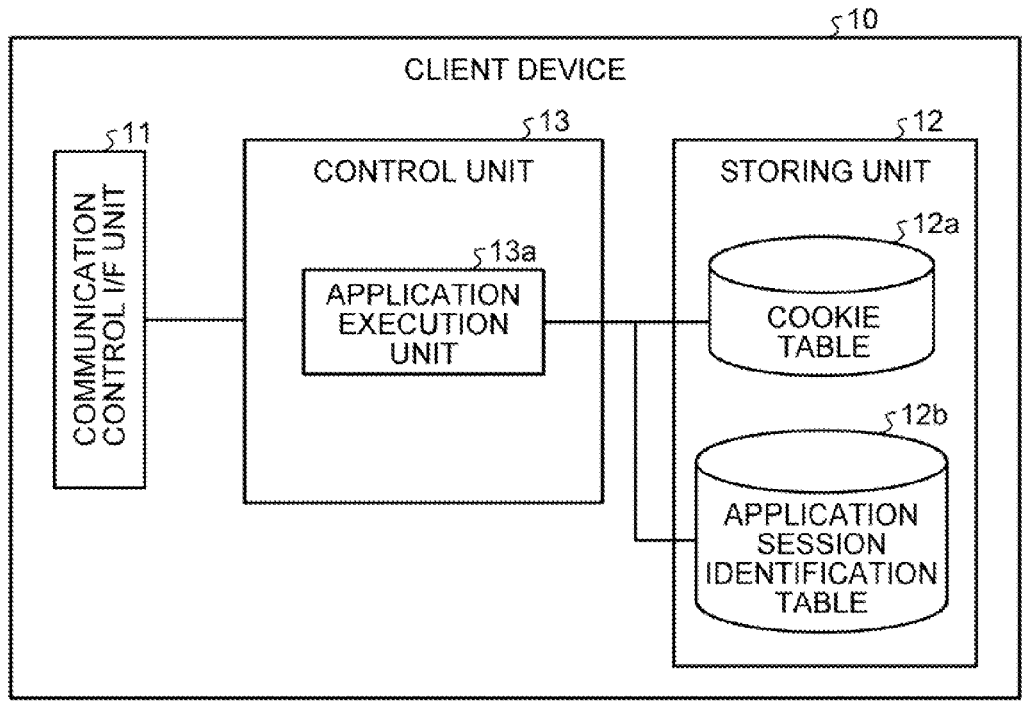

Preferred embodiments of the present invention will be explained with reference to accompanying drawings. The present invention is not limited to the embodiments described below.

[a] First Embodiment

Overall Configuration

First, the overall configuration of a system including a load balancing apparatus to be disclosed will be described with reference to FIG. 1. FIG. 1 is a schematic diagram illustrating the overall configuration of the system including the load balancing apparatus according to a first embodiment.

As illustrated in FIG. 1, the system has a client device, a load balancing apparatus, a plurality of relay devices, a plurality of server devices, and a management device. The number of devices is not limited to that illustrated in FIG. 1.

The client device is a terminal device that uses Web services provided by the server devices. As illustrated in FIG. 2A, the client device holds an ARP table 1 in which an "IP" indicating an Internet Protocol (IP) address of the load balancing apparatus is associated with a "MAC" indicating a media access control (MAC) address of the load balancing apparatus. Here, in the ARP table 1, an "IP-SLB" is stored as the "IP", and a "MAC-SLB" is stored as the "MAC". The "ARP" stands for the address resolution protocol. Furthermore, as illustrated in FIG. 2B, the client device stores therein, as network information, an "IP-CL" as the client device's IP address and a "MAC-CL" as the client device's MAC address and performs communication using them. FIG. 2A is a schematic diagram illustrating an ARP table held by a client device. FIG. 2B is a schematic diagram illustrating the network configuration of the client device.

The load balancing apparatus is a device that performs load balancing, with respect to the relay devices, on request messages received from the client device. As illustrated in FIG. 3A, the load balancing apparatus holds, as an ARP table 2, an "IP-CL and MAC-CL" as an "IP and MAC" of the client device and an "IP-MSG and MAC-MSG" as an "IP and MAC" of a relay device. The load balancing apparatus holds the same number of ARP tables 2 as there are relay devices. Furthermore, as illustrated in FIG. 3B, the load balancing apparatus stores therein, as network information, an "IP-SLB" as the load balancing apparatus's IP address and a "MAC-SLB" as the load balancing apparatus's MAC address and performs communication using them. FIG. 3A is a schematic diagram illustrating an ARP table held by a load balancing apparatus. FIG. 3B is a schematic diagram illustrating the network configuration of the load balancing apparatus.

Each of the relay devices is a device that performs load balancing, with respect the server devices, on request messages received from the load balancing apparatus. As illustrated in FIG. 4A, each relay device holds, as an ARP table 3, an "IP-CL and MAC-SLB" as the "IP and MAC" of the client device and an "IP-SLB and MAC-SLB" as the "IP and MAC" of the load balancing apparatus. Furthermore, each relay device further holds, in the ARP table 3, an "IP-SVR and MAC-SLB" as an "IP and MAC" of the server device. Each relay device holds the same number of ARP tables 3 as there are server devices. As illustrated in FIG. 4B, each relay device stored therein, as network information, an "IP-MSG" as the relay device's IP address and a "MAC-MSG" as the relay device's MAC address and performs communication using them.

As illustrated in FIG. 5, each relay device holds a client-side connection and a server-side connection as a connection table. Specifically, each relay device stores therein transmission control protocol (TCP) port numbers and user datagram protocol (UDP) port numbers for devices to be connected. For example, "IP-CL: Port #1 and IP-MSG: Port #2" are stored as a client-side connection. This information indicates that a session, between a client device that has an address of the IP-CL connected to a port 1 and a relay device that has an address of the IP-MSG connected to a port 2, has been established. Furthermore, in the table, "IP-MSG: Port #3 and IP-SVR: Port #2" are stored as the server-side connection. This information indicates that a session, between a relay device that has an address of the IP-MSG connected to a port 3 and a server device that has an address of the IP-SVR connected to the port 2, has been established. FIG. 4A is a schematic diagram illustrating the ARP table held by the relay device. FIG. 4B is a schematic diagram illustrating the network configuration of the relay device. FIG. 5 is a schematic diagram illustrating the connection table held by the relay device.

Each of the server devices is a device that provides, for example, Web services while guaranteeing uniqueness between the client device and the server device. As illustrated in FIG. 6A, each server device holds, as an ARP table 4, an "IP-MSG and MAC-MSG" as the "IP and MAC" of the relay device. Furthermore, as illustrated in FIG. 6B, each server device stores therein, as network information, an "IP-SVR" as the server device's IP address and a "MAC-SVR" as the server device's MAC address and performs communication using them. Each server device holds the same number of ARP tables 4 as there are server devices. FIG. 6A is a schematic diagram illustrating the ARP table held by each server device. FIG. 6B is a schematic diagram illustrating the network configuration of each server device.

The management device is a device that distributes transfer rules for performing load balancing to the relay devices or the load balancing apparatus. The management device also holds an ARP table. Specifically, the management device holds the "IP and MAC" of the relay devices, the "IP and MAC" of the load balancing apparatus, and the "IP and MAC" of the server devices.

Configuration of Each Device

In the following, the configuration of each device described above will be described with reference to FIGS. 7 to 19. In this specification, a client device 10, a load balancing apparatus 20, a relay device 30, a server device 40, and a management device 50 are described in the order they are listed in this sentence.

Configuration of the Client Device

First, the configuration of the client device will be described with reference to FIG. 7. FIG. 7 is a block diagram illustrating the configuration of the client device. As illustrated in FIG. 7, the client device 10 includes a communication control I/F unit 11, a storing unit 12, and a control unit 13.

The communication control I/F unit 11 controls communication related to various kinds of information exchanged with other devices, such as the load balancing apparatus 20. For example, the communication control I/F unit 11 sends a request message to the load balancing apparatus 20 and receives a request message from the load balancing apparatus 20. Furthermore, the communication control I/F unit 11 establishes a session with the server device 40 to send/receive information on a service that is used.

The storing unit 12 stores therein data and programs needed for various kinds of processes performed by the control unit 13. The storing unit 12 has a cookie table 12a and an application session identification table 12b.

The cookie table 12a holds cookies that are associated with the destinations of request messages, such as destination uniform resource locators (URLs) or IP addresses specified by an application. For the cookies stored in this table, it is possible to use, for example, a path control identifier, which will be described later. Specifically, as illustrated in FIG. 8, the cookie table 12a stores therein "192.168.1.1 and K00000", "xxx.url and Kaaaaa", and the like as a "destination and cookie". FIG. 8 is a schematic diagram illustrating an example of information held by the cookie table 12a.

The application session identification table 12b holds application identifiers that are associated with the destinations of request messages, such as destination URLs or IP addresses specified by an application. For the application identifiers stored in this table, it is possible to use, for example, session information, which will be described later. Specifically, as illustrated in FIG. 9, the application session identification table 12b stores therein, "192.168.1.1 and S00000", "xxx.url and S11111", and the like as a "destination and application session identifier". FIG. 9 is a schematic diagram illustrating an example of information held by the application session identification table 12b.

The control unit 13 has a control program and an internal memory for storing necessary data and programs prescribing various kinds of procedures. The control unit 13 includes an application execution unit 13a. These units execute various kinds of processes.

The application execution unit 13a executes applications that use, for example, a Web browser, sends request messages to the load balancing apparatus 20, and uses various kinds of services. For example, the application execution unit 13a executes an application, and, if an URL or an IP address serving as the destination is stored in the cookie table 12a, obtains a cookie (path control identifier) that corresponds to the destination. Then, the application execution unit 13a puts the obtained cookie in a layer 7 protocol header of a SOAP message. In a similar manner, if an URL or an IP address serving as the destination is stored in the application session identification table 12b, the application execution unit 13a obtains an application session identifier that corresponds to the destination. Then, the application execution unit 13a puts the obtained session identifier in a message content portion of the SOAP message. The application execution unit 13a sends, to the load balancing apparatus 20, a message in which the cookie (path control identifier) or the session identifier is contained.

Configuration of the Load Balancing Apparatus

Figures 10, 11, 12:
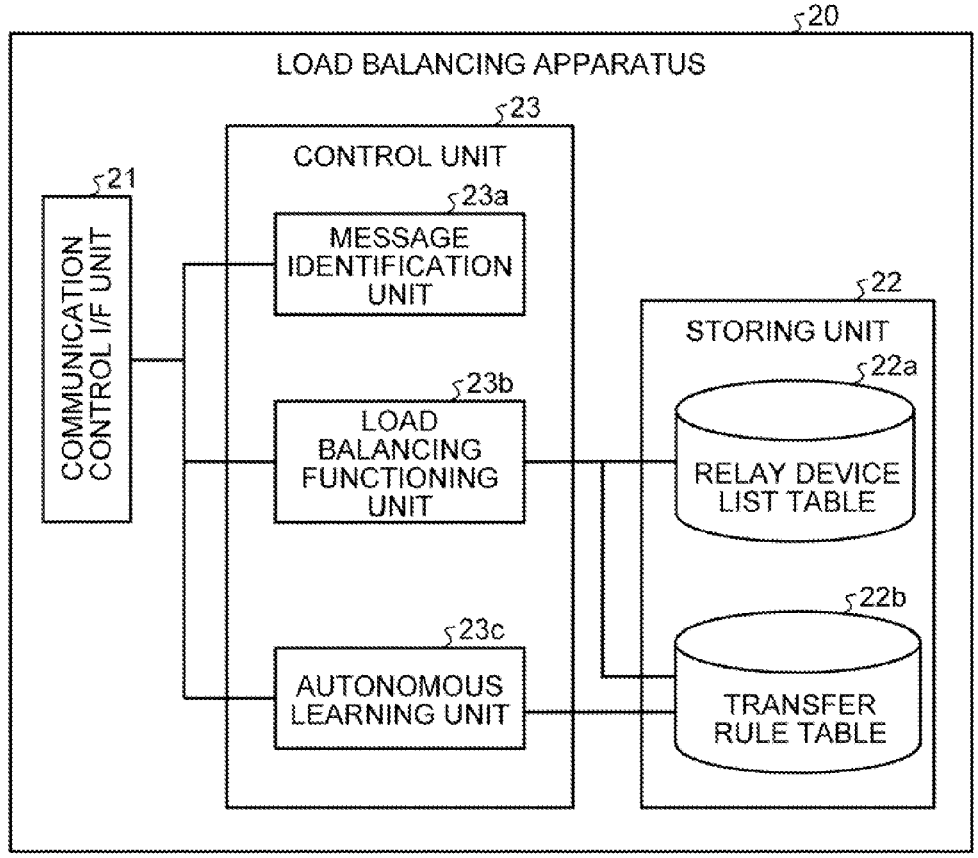

Next, the configuration of the load balancing apparatus will be described with reference to FIG. 10. FIG. 10 is a block diagram illustrating the configuration of the load balancing apparatus. As illustrated in FIG. 10, the load balancing apparatus 20 includes a communication control I/F unit 21, a storing unit 22, and a control unit 23.

The communication control I/F unit 21 controls communication related to various kinds of information exchanged with other devices such as the client device 10 and the relay device 30. For example, the communication control I/F unit 21 receives a request message from the client device 10 and sends a reply message to the client device 10. Furthermore, the communication control I/F unit 21 sends a request message to the relay device 30 and receives a reply message from the relay device 30. The communication control I/F unit 21 receives, from the relay device 30, a transfer rule that is used when load balancing is performed, with respect to the relay device 30, on a request messages.

The storing unit 22 stores therein data and programs needed for various kinds of processes performed by the control unit 23. The storing unit 22 has a relay device list table 22a and a transfer rule table 22b.

The relay device list table 22a stores therein IP addresses of the relay devices on which load balancing is performed by the load balancing apparatus 20. For example, as illustrated in FIG. 11, the relay device list table 22a stores therein, "10.1.1.1", "10.1.1.2", "10.1.1.3", and the like as "IP addresses of relay devices". FIG. 11 is a schematic diagram illustrating an example of information stored in the relay device list table 22a.

The transfer rule table 22b specifies sessions that guarantee uniqueness and holds the transfer rule used for performing load balancing with respect to an appropriate relay device. As illustrated in FIG. 12, the transfer rule table 22b stores therein, for example, "K00000 and 10.1.1.1" as "path information identifiers and IP addresses of transfer destination relay devices". The "path information identifier" stored in this table is used to specify an appropriate relay device for the transfer destination. FIG. 12 is a schematic diagram illustrating an example of information stored in the transfer rule table 22b.

The control unit 23 has a control program and an internal memory for storing necessary data and programs prescribing various kinds of procedures. The control unit 23 includes a message identification unit 23a, a load balancing functioning unit 23b, and an autonomous learning unit 23c. These units execute various kinds of processes.

The message identification unit 23a receives a request message from the client device 10 and identifies whether the message contains a "path information identifier". For example, if the message identification unit 23a receives, from the client device 10, a SOAP request message, the message identification unit 23a identifies whether, by referring to a cookie of a layer 7 protocol header in the message, a "path information identifier" is contained therein. Then, the message identification unit 23a sends, to the load balancing functioning unit 23b, the received message and the identification result.

The load balancing functioning unit 23b performs load balancing, with respect to the relay device 30, on a request message received from the client device 10. For example, for the message that is determined, by the message identification unit 23a, to not contain a "path information identifier", the load balancing functioning unit 23b decides, in accordance with an autonomous distributed algorithm such as a round robin algorithm, the relay device for the destination of the load balancing. Then, the load balancing functioning unit 23b specifies, from the relay device list table 22a, the IP address of the decided relay device and sends the request message received from the client device 10.

In contrast, for the message that is determined, by the message identification unit 23a, to contain a "path information identifier", the load balancing functioning unit 23b obtains, by referring to a cookie of the layer 7 protocol header in the message, a "path information identifier". Then, the load balancing functioning unit 23b specifies, from the transfer rule table 22b, an IP address of a relay device corresponding to the obtained "path information identifier" and sends the request message received from the client device 10.

The autonomous learning unit 23c receives a reply message from a relay device, obtains a path control identifier and an IP address of a relay device for the transfer destination; creates a transfer rule, and stores it in the transfer rule table 22b. For example, if the autonomous learning unit 23c receives a SOAP reply message from a relay device, the autonomous learning unit 23c obtains, by referring to a cookie of the layer 7 protocol header, a "path information identifier". Furthermore, the autonomous learning unit 23c obtains, from, for example, a layer 3 protocol header in the reply message, an "IP address of a relay device" that is the sending source. Thereafter, the autonomous learning unit 23c creates a transfer rule in which "path information identifiers" are associated with "IP addresses of relay devices" and then stores it in the transfer rule table 22b.

Configuration of the Relay Device

Figures 13, 14, 15:
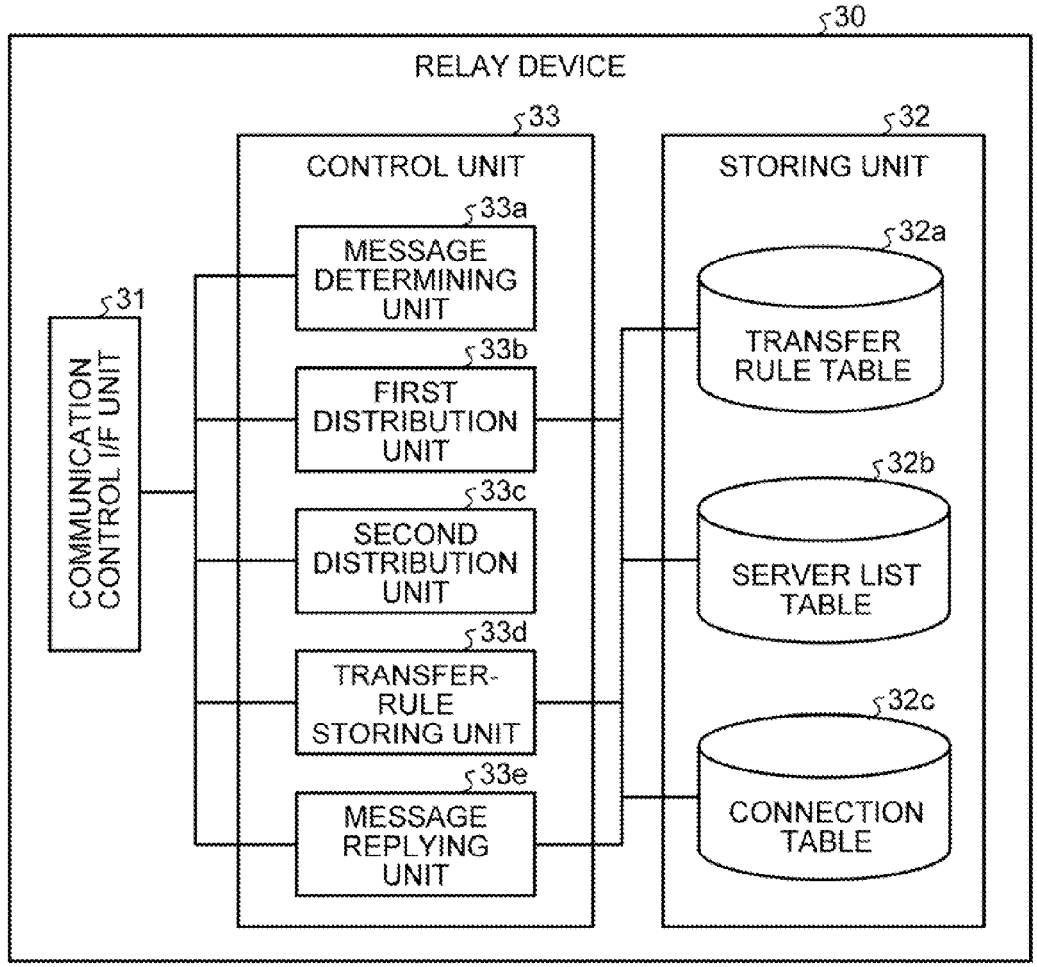

In the following, the configuration of each relay device will be described with reference to FIG. 13. FIG. 13 is a block diagram illustrating the configuration of a relay device. As illustrated in FIG. 13, the relay device 30 includes a communication control I/F unit 31, a storing unit 32, and a control unit 33.

The communication control I/F unit 31 controls communication related to various kinds of information exchanged with other devices such as the load balancing apparatus 20, the server device 40, and the management device 50. For example, the communication control I/F unit 31 receives a request message from the load balancing apparatus 20 and sends a reply message to the load balancing apparatus 20. Furthermore, the communication control I/F unit 31 performs load balancing, with respect to the server device 40, on a request message and receives a reply message from the server device 40. The communication control I/F unit 31 receives, from the management device 50, a transfer rule that is used when load balancing is performed, with respect to the server device 40, on a request message.

The storing unit 32 stores therein data and programs, needed for various kinds of processes performed by the control unit 33. The storing unit 32 has a transfer rule table 32a, a server list table 32b, and a connection table 32c.

The transfer rule table 32a holds a transfer rule in which session information that identifies a session between the client device 10 and a server device is associated with server information that specifies a server device to which a message sent from the client device is sent. As illustrated in FIG. 14, the transfer rule table 32a stores therein, for example, "S00001 and 1.1.1.1" as "a session identifier and an IP address of a transfer destination server device". FIG. 14 is a schematic diagram illustrating an example of information stored in the transfer rule table 32a.

The server list table 32b stores therein IP addresses of the server devices on which load balancing is performed by the relay device 30. As illustrated in FIG. 15, the server list table 32b stores, for example, "1.1.1.1", "1.1.1.2", and the like as "IP addresses of server devices". FIG. 15 is a schematic diagram illustrating an example of information stored in the server list table 32b.

Figures 16, 17:
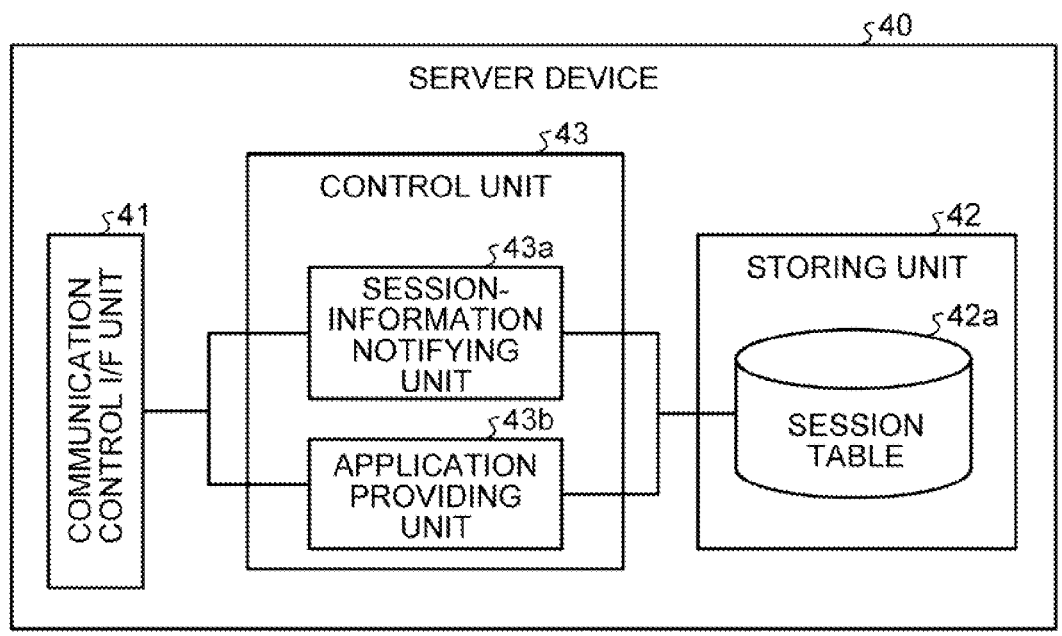
FIG. 16 is a schematic diagram illustrating an example of information stored in a connection table 32c.
FIG. 17 is a block diagram illustrating the configuration of a server device.

After receiving a message request from the client device 10, the connection table 32c holds information on a packet header that is rewritten when it is relayed to a server device. As illustrated in FIG. 16, the connection table 32c stores therein, for example, a "client-side connection" indicating a connection that receives a request from a client device and a "server-side connection" indicating a connection that sends/receives a request from a server device. In the "client-side connection", information is stored in such a manner that an IP address and a port number of a source client device are associated with an IP address and a port number of a destination relay device. In the "server-side connection", information is stored in such a manner that an IP address and a port number of a source relay device are associated with an IP address and a port number of a destination server device. FIG. 16 is a schematic diagram illustrating an example of information stored in the connection table 32c.

The control unit 33 has a control program and an internal memory for storing necessary data and programs prescribing various kinds of procedures. The control unit 33 includes a message determining unit 33a, a first distribution unit 33b, a second distribution unit 33c, a transfer-rule storing unit 33d, and a message replying unit 33e. These units execute various kinds of processes.

The message determining unit 33a receives a request message sent from the load balancing apparatus 20 and determines whether the request message contains a session identifier. For example, if the message determining unit 33a receives a SOAP request message sent from the load balancing apparatus 20, by referring to the message content portion of the message, the message determining unit 33a determines whether a "session identifier" is contained in the message. Then, the message determining unit 33a sends, to the first distribution unit 33b, a message that is determined to contain the "session identifier". In contrast, the message determining unit 33a sends, to the second distribution unit 33c, a message that is determined to not contain "session identifier" is not contained.

If the message determining unit 33a determines that a message contains the session identifier, the first distribution unit 33b sends, in accordance with the transfer rule held by the transfer rule table 32a, the message to an appropriate server device. For example, if the session identifier "S00001" is contained in a message content portion of a request message, the first distribution unit 33b specifies, from the transfer rule table 32a, the IP address "1.1.1.1" of the transfer destination that corresponds to "S00001". Then, the first distribution unit 33b sends a request message to the specified IP address "1.1.1.1".

If the message determining unit 33a determines that a message does not contain the session identifier, the second distribution unit 33c sends the message to a server device that is specified in accordance with a predetermined condition. For example, if the message determining unit 33a determines that a message does not contain the session identifier, the second distribution unit 33c specifies, in accordance with an autonomous distributed algorithm such as a round robin algorithm, a distribution destination server device. Then, the second distribution unit 33c specifies, from the server list table 32b, the IP address of the specified server device and sends a request message.

Furthermore, the second distribution unit 33c obtains an IP address and a port number of the source client device and an IP address and a port number of the destination relay device that are received by the message determining unit 33a and then stores them in the "client-side connection" in the connection table 32c. In a similar manner, the second distribution unit 33c obtains an IP address and a port number of the source relay device and an IP address and a port number of the destination server device that are obtained when a message is sent/received and then stores them in the "server-side connection" in the connection table 32c.

The transfer-rule storing unit 33d receives, from the management device 50, a transfer rule in which a session identifiers is associated with server information that specifies a server device to which a message is sent by the second distribution unit 33c. Then, the transfer-rule storing unit 33d stores the transfer rule in the transfer rule table 32a. For example, the transfer-rule storing unit 33d receives, from the management device 50, the session identifier "S11111" and the server information "1.1.1.2" and stores them, in an associated manner, in the transfer rule table 32a.

The message replying unit 33e sends, to the load balancing apparatus 20, a reply message in which a path control identifier that is used to identify a path for a message sent from the client device 10 is embedded. For example, the message replying unit 33e receives a SOAP reply message from a server device to which a message is sent by the first distribution unit 33b or the second distribution unit 33c. Then, the message replying unit 33e creates a path control identifier that is used to specify the relay device 30 and also is used to identify a session with the client device 10 that receives the reply message. Then, in a cookie area in the layer 7 protocol header that is an area to which the load balancing apparatus 20 can refer, the message replying unit 33e creates a reply message in which the created path control identifier is embedded and then sends the reply message to the load balancing apparatus 20.

Configuration of the Server Device

In the following, the configuration of each server device will be described with reference to FIG. 17. FIG. 17 is a block diagram illustrating the configuration of a server device. As illustrated in FIG. 17, the server device 40 includes a communication control I/F unit 41, a storing unit 42, and a control unit 43.

The communication control I/F unit 41 controls communication related to various kinds of information exchanged with other devices, such as the relay device 30 and the management device 50. For example, the communication control I/F unit 41 receives a request message from the relay device 30 and sends a reply message to the relay device 30. Furthermore, the communication control I/F unit 41 sends, to the management device 50, session information including session identifiers.

The storing unit 42 stores therein data and programs needed for various kinds of processes performed by the control unit 43. The storing unit 42 has a session table 42a.

Figures 18, 19:
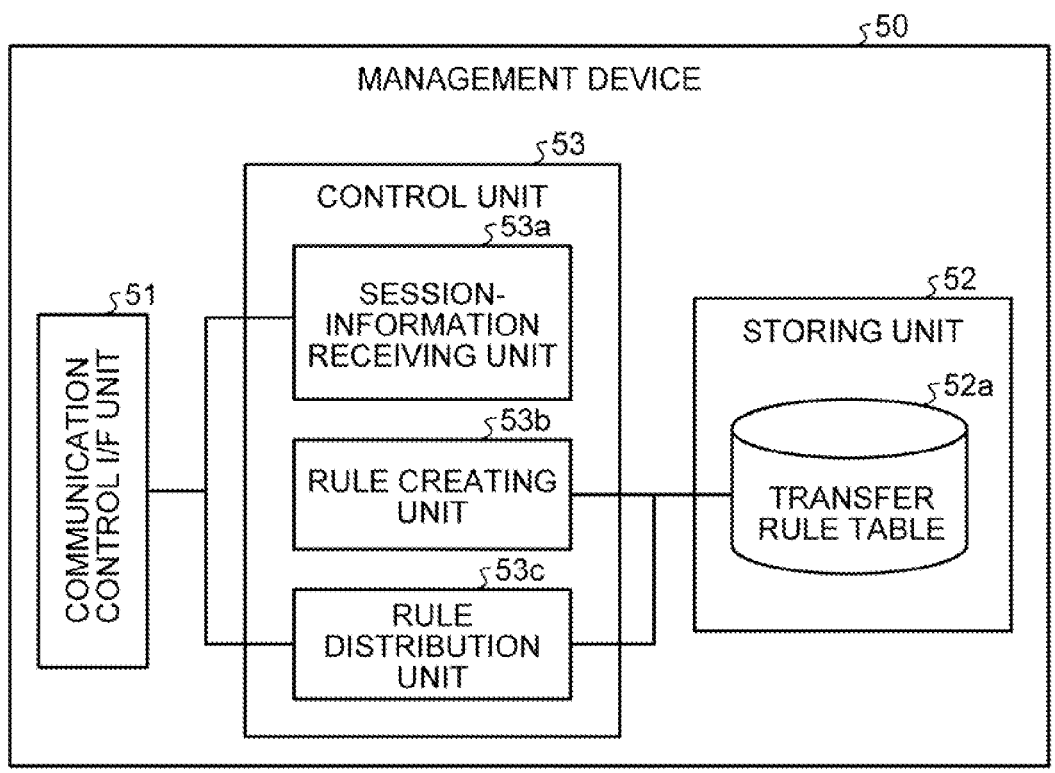

The session table 42a stores therein data exchanged in a session that is connected to the client device 10. As illustrated in FIG. 18, the session table 42a stores therein, for example, "S00001 and XXXX" and "S11111 and YYYY" as a "session identifier and session data". The "session identifier" or the "session data" stored in this table can be obtained from a message sent from the relay device 30. FIG. 18 is a schematic diagram illustrating an example of information stored in the session table 42a.

The control unit 43 has a control program and an internal memory for storing necessary data and programs prescribing various kinds of procedures. The control unit 43 includes a session-information notifying unit 43a and an application providing unit 43b. These units execute various kinds of processes.

The session-information notifying unit 43a sends, to the management device 50, a session identifier that is used to identify a session between the client device 10 and a server device. For example, the session-information notifying unit 43a sends, to the management device 50, session information in which the session identifier "S00001" created by the application providing unit 43b, which will be described later, is associated with the IP address "1.1.1.1" of the server device.

Furthermore, the session-information notifying unit 43a receives, from the management device 50, an IP address of the relay device specified as a path for a message to the client device 10. Then, the session-information notifying unit 43a embeds the session identifier in a message content portion of a reply message with respect to the received request message and sends it to the IP address of the received relay device.

The application providing unit 43b obtains, from a memory or the like, a service, requested from the client device 10, in which a session has been established via the load balancing apparatus 20 and the relay device 30, and the application providing unit 43b then provide the service to the client device 10. For example, if the application providing unit 43b receives, from a relay device, a message in which a session identifier is not contained, the application providing unit 43b creates the session identifier "S00001" that is used to identify a session with the client device 10 that sends the message. Then, the application providing unit 43b sends, to the session-information notifying unit 43a, the created session identifier "S00001".

Configuration of the Management Device

In the following, the configuration of the management device will be described with reference to FIG. 19. FIG. 19 is a block diagram illustrating the configuration of the management device. As illustrated in FIG. 19, the management device 50 includes a communication control I/F unit 51, a storing unit 52, and a control unit 53.

The communication control I/F unit 51 controls communication related to various kinds of information exchanged with other devices such as the relay device 30 and the server device 40. For example, the communication control I/F unit 51 receives session information from the server device 40. Furthermore, the communication control I/F unit 51 sends a transfer rule to the relay device 30.

The storing unit 52 stores therein data and programs needed for various kinds of processes performed by the control unit 53. The storing unit 52 has a transfer rule table 52a. The transfer rule table 52a is a storing unit that stores therein transfer rules created by a rule creating unit 53b, which will be described later and stores therein information similar to the transfer rule table 32a held by the relay device 30.

The control unit 53 has a control program and an internal memory for storing necessary data and programs prescribing various kinds of procedures. The control unit 53 includes a session-information receiving unit 53a, the rule creating unit 53b, and a rule distribution unit 53c. These units execute various kinds of processes.

The session-information receiving unit 53a receives a session identifier from a server device 40 to which a message sent from the client device 10 is delivered by a relay device 30 via the load balancing apparatus 20. For example, the session-information receiving unit 53a receives session information in which the session identifier "S00001", the IP address "1.1.1.1" of the server device to which the message is sent, and the IP address of the relay device 30 serving as a load balancing source are associated.

The rule creating unit 53b creates a relay device transfer rule, which is a transfer rule referred to by the relay device 30 when it sends a message, in which session identifiers are associated with server information. For example, the rule creating unit 53b creates a relay device transfer rule in which the session identifier "S00001" that is received by the session-information receiving unit 53a is associated with the IP address "1.1.1.1" of the server device to which the message is sent. Then, the rule creating unit 53b stores the created relay device transfer rule in the transfer rule table 52a.

The rule distribution unit 53c sends, to the relay device specified in accordance with a predetermined condition, the relay device transfer rule created by the rule creating unit 53b. For example, the rule distribution unit 53c specifies a relay device in accordance with a relay device 30 serving as a load balancing source contained in session information, an autonomous distributed algorithm such as a round robin algorithm, a predetermined sequence that is defined in advance, or the like. Then, the rule distribution unit 53c obtains, from the transfer rule table 52a, the rule created by the rule creating unit 53b and sends it to the specified relay device.

Processing Sequence

Figure 20:
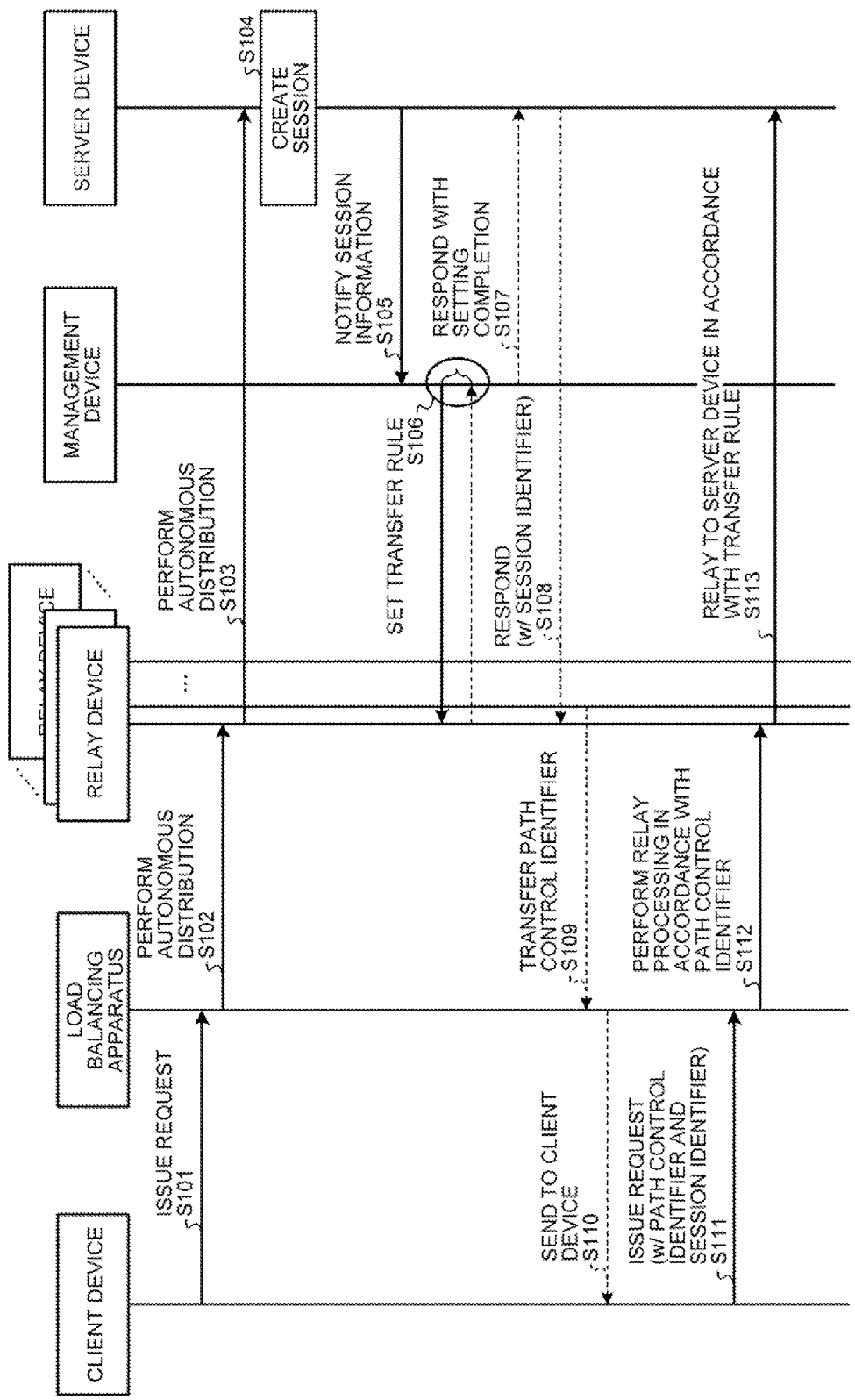
FIG. 20 is a schematic diagram illustrating a processing sequence performed by a system including the load balancing apparatus according to a first embodiment.

In the following, a processing sequence performed by the above described system will be described with reference to FIG. 20. FIG. 20 is a schematic diagram illustrating a processing sequence performed by the system including the load balancing apparatus according to the first embodiment.

As illustrated in FIG. 20, the application execution unit 13a in the client device 10 starts an application and sends a request message to the load balancing apparatus 20 (Step S101). After the message identification unit 23a in the load balancing apparatus 20 determines that the received message does not contain a path control identifier, the load balancing functioning unit 23b performs load balancing, on the request message, with respect to the relay device 30 that is specified in accordance with an autonomous distributed algorithm (Step S102).

In the relay device 30, after the message determining unit 33a that receives the request message determines that the message does not contain the path control identifier, the second distribution unit 33c performs load balancing, on the message, with respect to the server device 40 that is specified using the autonomous distributed algorithm (Step S103).

Then, in the server device 40, the application providing unit 43b that receives the message creates a session identifier that establishes a session between the server device 40 and the client device 10 that sends the message (Step S104). Subsequently, the session-information notifying unit 43a sends, to the management device 50, session information that includes the created session identifier and the IP address of the server device 40 (Step S105).

In the management device 50, the rule creating unit 53b creates a transfer rule in which the received session identifier is associated with the IP address, and the rule distribution unit 53c sends the created transfer rule to the relay device that is specified using, for example, the autonomous distributed algorithm (Step S106). Then, if the rule distribution unit 53c in the management device 50 receives a completion notification indicating that the relay device 30 stores therein the transfer rule, the rule distribution unit 53c sends, to the server device 40, a notification indicating that a setting of the transfer rule has been completed (Step S107). At this time, the rule distribution unit 53c in the management device 50 also sends, to the server device 40, the IP address of the relay device 30 that is specified as a message path to the client device 10.

In the server device 40, the session-information notifying unit 43a that receives the setting completion notification embeds the session identifier in the message content portion of a reply message with respect to the received request message and sends it to the IP address of the received relay device 30 (Step S108).

The relay device 30 that receives the session identifier sends, to the load balancing apparatus 20, a reply message in which a path control identifier that is used to identify a path for the message sent from the client device 10 is embedded (Step S109). The load balancing apparatus 20 sends the received message to the client device 10 (Step S110).

Then, the application execution unit 13a in the client device 10 sends, to the load balancing apparatus 20, a request message in which the path control identifier and the session identifier are embedded therein (Step S111).

In the load balancing apparatus 20, the message identification unit 23a determines that the received message contains the path control identifier, and the load balancing functioning unit 23b performs, in accordance with the transfer rule specified by the path control identifier, load balancing with respect to the relay device 30 (Step S112).

In the relay device 30, after the message determining unit 33a determines that the message contains the path control identifier, the first distribution unit 33b performs, with respect to the server device 40 that is specified by the path control identifier, load balancing on the message (Step S113). In this way, it is possible to perform communication in which uniqueness is guaranteed.

Flowchart

Figure 21:
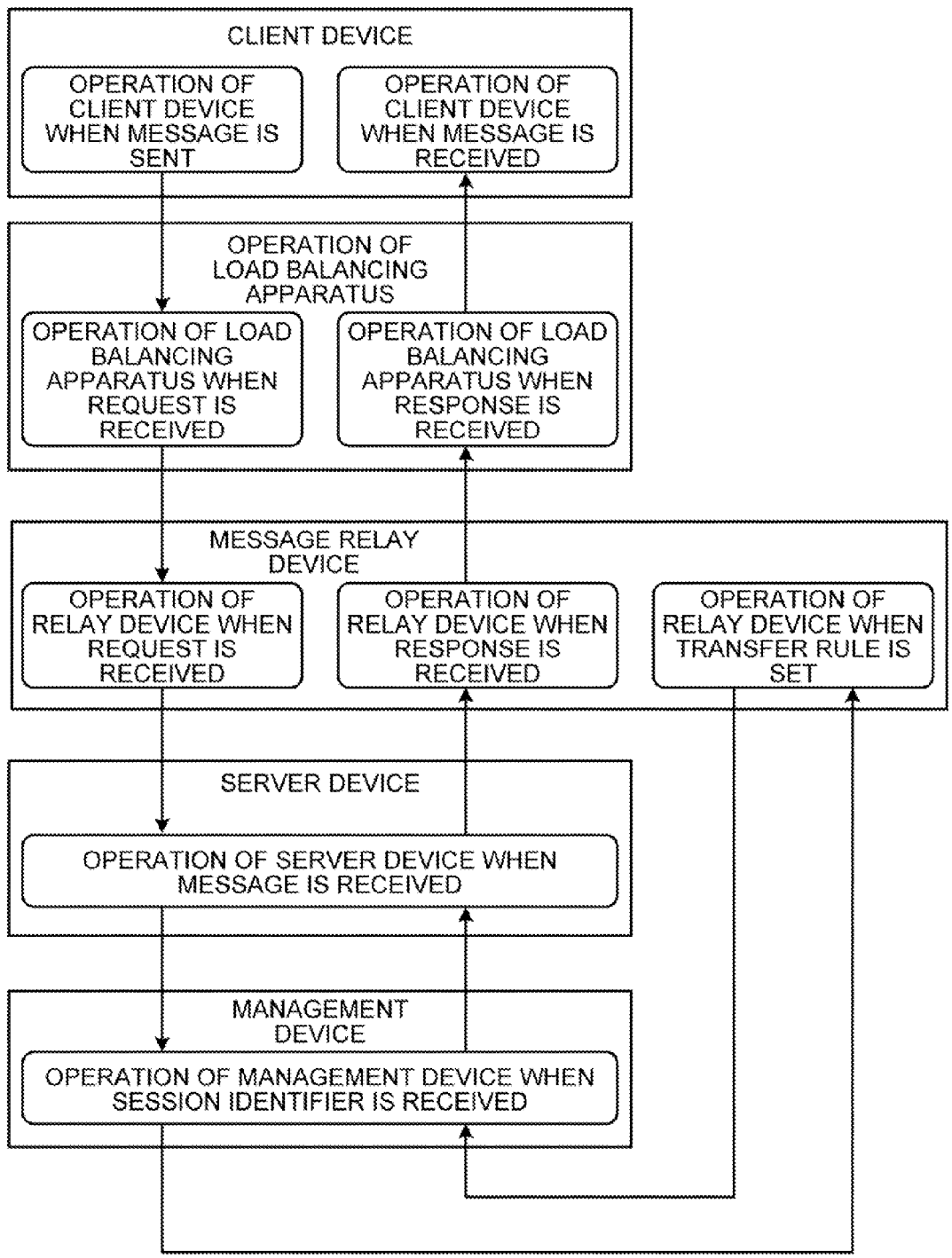
FIG. 21 is a schematic diagram explaining various situations of each device.

In the following, flowcharts of devices in the above-described system will be explained with reference to FIGS. 21 to 43. Here, the flow of the operations performed by each device in various situations will be explained. Specifically, as illustrated in FIG. 21, the following explanations are given: the operation of the client device when a request is sent, the operation of the load balancing apparatus when the request is received, the operation of the relay device when the request is received, the operation of the server device when the request is received, and the operation of the management device when a session identifier is received. Furthermore, the following explanations are also given: the operation of the relay device when a reply is received, the operation of the load balancing apparatus when the reply is received, the operation of the client device when the reply is received, and the operation of the relay device when a transfer rule is set. FIG. 21 is a schematic diagram explaining various situations of each device.

Operation of the Client Device when a Request is Sent

Figure 22:
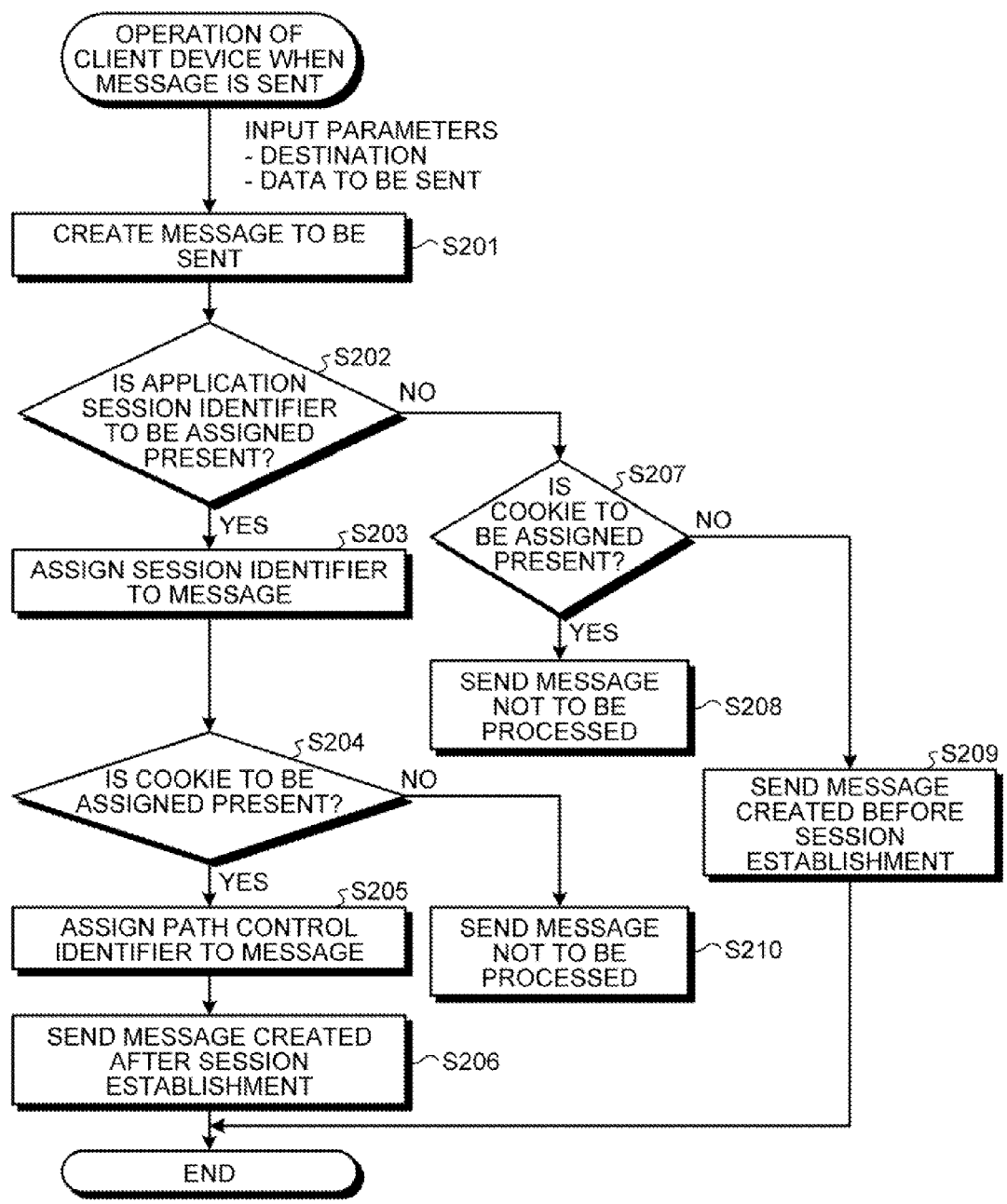
FIG. 22 is a flowchart illustrating the operation of the client device when a request is sent.

First, the flow of the operation of the client device when a request is sent will be explained using to FIG. 22. FIG. 22 is a flowchart illustrating the operation of the client device when a request is sent.

As illustrated in FIG. 22, a user or an application to be executed specifies a destination (URL or IP address), and the application execution unit 13a in the client device 10 creates a request message to be sent (Step S201).

As illustrated in FIG. 23, the message created here has an L2 header indicating an L2 protocol header, a packet header indicating an L3 protocol header and an L4 protocol header, and a protocol header indicating an L7 protocol header. Furthermore, the message created here also has a message content portion. In the L2 header, the MAC address of the client device 10 serving as the source MAC address and the MAC address of the load balancing apparatus 20 serving as the destination MAC address are described. In the packet header, the IP address and the port number of the client device 10 are described as the source IP address and port number, and the IP address and the port number of the load balancing apparatus 20 are described as the destination IP address and port number. In the message content portion, the data main body of a request message is described. Furthermore, the source MAC address, IP address, and port number can be obtained from a network setting in the client device 10 itself. The destination MAC address can be obtained by searching the ARP table 1 using, as a key, a destination IP address obtained from destination information, such as a uniform resource locator (URL), that is input by a user. The port number can be obtained from destination information that is input by a user. FIG. 23 is a schematic diagram illustrating an example of a message exhibited until a session is established.

The application execution unit 13a determines whether there is an application session identifier (session identifier) to be assigned (Step S202). For example, by searching the application session identification table 12b using the destination that is specified at Step S201 as a key, the application execution unit 13a can check if an application session identifier is present.

Then, if an application session identifier to be assigned is present (Yes at Step S202), the application execution unit 13a obtains that session identifier from the application session identification table 12b and assigns it to the request message to be sent (Step S203). At this time, the application execution unit 13a assigns the session identifier to the message content portion in the request message to be sent.

The application execution unit 13a determines whether a cookie (path control identifier) to be assigned is present (Step S204). For example, by searching the cookie table 12a using the destination specified at Step S201 as a key, the application execution unit 13a can check for the presence of a cookie (path control identifier).

If a cookie (path control identifier) is present (Yes at Step S204), the application execution unit 13a obtains, from the cookie table 12a, the target path control identifier and assigns it to the request message to be sent (Step S205). At this time, the application execution unit 13a assigns the path control identifier to a protocol header of the request message to be sent.

Thereafter, the application execution unit 13a sends, to the load balancing apparatus 20 serving as the destination, the request message in which the session identifier and the path control identifier are assigned (Step S206). As illustrated in FIG. 24, the message sent at this time has an L2 header, a packet header, a protocol header, and a message content portion. In the L2 header, the MAC address of the client device 10 serving as the source MAC address and the MAC address of the load balancing apparatus 20 serving as the destination MAC address are described. In the packet header, the IP address and the port number of the client device 10 are described as the source IP address and port number, and the IP address and the port number of the load balancing apparatus 20 are described as the destination IP address and port number. Furthermore, in the protocol header, a path control identifier is described. In the message content portion, data main body of the request message and the session identifier are described. FIG. 24 is a schematic diagram illustrating an example of a message exhibited after session establishment.

Referring back to Step S202, if an application session identifier to be assigned is not present (No at Step S202), in a similar manner at Step S204, the application execution unit 13a determines whether a cookie (path control identifier) to be assigned is present (Step S207).

If a cookie (path control identifier) to be assigned is present (Yes at Step S207), the application execution unit 13a sends, to the load balancing apparatus 20, a message that is not to be processed and that is different from the messages illustrated in FIG. 23 and FIG. 24 (Step S208). In contrast, if a cookie (path control identifier) to be assigned is not present (No at Step S207), the application execution unit 13a sends, to the load balancing apparatus 20, the request message illustrated in FIG. 24 (Step S209).

Furthermore, at Step S204, if the application execution unit 13a determines that a cookie (path control identifier) to be assigned is not present (No at Step S204), the application execution unit 13a sends, to the load balancing apparatus 20, a message that is not to be processed and that is different from the message illustrated in FIG. 23 or FIG. 24 (Step S210).

Operation of the Load Balancing Apparatus when a Request is Received

Figure 25:
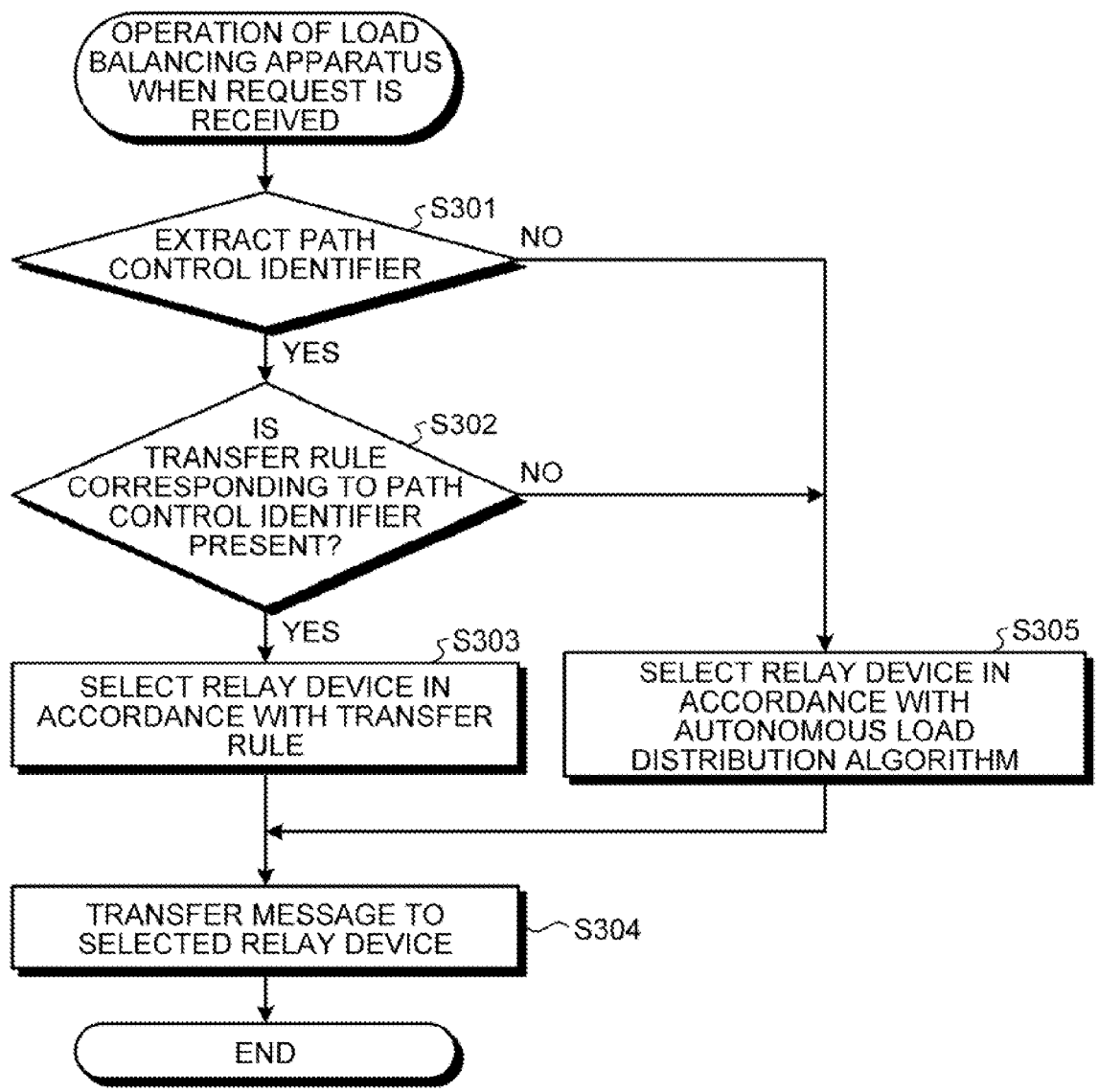
FIG. 25 is a flowchart illustrating the operation of the load balancing apparatus when a request is received.

In the following, the flow of the operation of the load balancing apparatus when a request is received will be explained using to FIG. 25. FIG. 25 is a flowchart illustrating the operation of the load balancing apparatus when a request is received.

As illustrated in FIG. 25, the message identification unit 23a in the load balancing apparatus 20 receives the request message from the client device 10 and identifies whether that message contains the "path control identifier" (Step S301).

For example, by referring to the cookie in the protocol header in the received request message, the message identification unit 23a determines whether the "path control identifier" is present in the message.

Then, if the message identification unit 23a extracts the "path control identifier" (Yes at Step S301), the load balancing functioning unit 23b determines whether a transfer rule that corresponds to the extracted "path control identifier" is present (Step S302). For example, the load balancing functioning unit 23b searches, using the extracted "path control identifier" as a key, the transfer rule table 22b to determine whether a transfer rule corresponding to the extracted "path control identifier" is present.

If a transfer rule corresponding to the extracted "path control identifier" is present (Yes at Step S302), the load balancing functioning unit 23b specifies a relay device 30 in accordance with the transfer rule (Step S303) and sends the received request message to that relay device (Step S304). Specifically, the load balancing functioning unit 23b converts the destination value of the packet header of the received message to the IP address of the relay device. Furthermore, the load balancing functioning unit 23b converts the destination value of the L2 header of the received message to the MAC address of the relay device that is specified from the ARP table 2 using the IP address of the relay device as a key.

As illustrated in FIG. 26, the message created in this way has, for example, an L2 header, a packet header, a protocol header, and a message content portion. In the L2 header, the MAC address of the client device 10 serving as a source MAC address and the MAC address of the relay device 30 serving as a destination MAC address are described. In the packet header, the IP address and the port number of the client device 10 are described as the source IP address and port number, and the IP address and the port number of the relay device 30 are described as the destination IP address and port number. Furthermore, in the protocol header, the path control identifier is described. In the message content portion, the data main body of the request message and the session identifier are described. FIG. 26 is a schematic diagram illustrating an example of a message sent to the relay device after session establishment.

In contrast, if the message does not contain the "path control identifier" (No at Step S301), the load balancing functioning unit 23b selects, in accordance with an autonomous load distribution algorithm, a relay device 30 for load balancing and sends the received request message to the relay device 30 (Step S305). If a transfer rule corresponding to the extracted "path control identifier" is not present (No at Step S302), the same process is also performed.

In a similar manner as in FIG. 26, the message that is sent at this time is a message in which the destination value of the packet header is converted to the IP address of the relay device and the destination value of the L2 header of the message is converted to the MAC address of the relay device. As illustrated in FIG. 27, FIG. 27 differs from FIG. 26 in that the path control identifier is not described in the protocol header and the message content portion is not described in the session identifier. FIG. 27 is a schematic diagram illustrating an example of a message sent to the relay device before session establishment.

Operation of the Relay Device when the Request is Received

Figure 28:
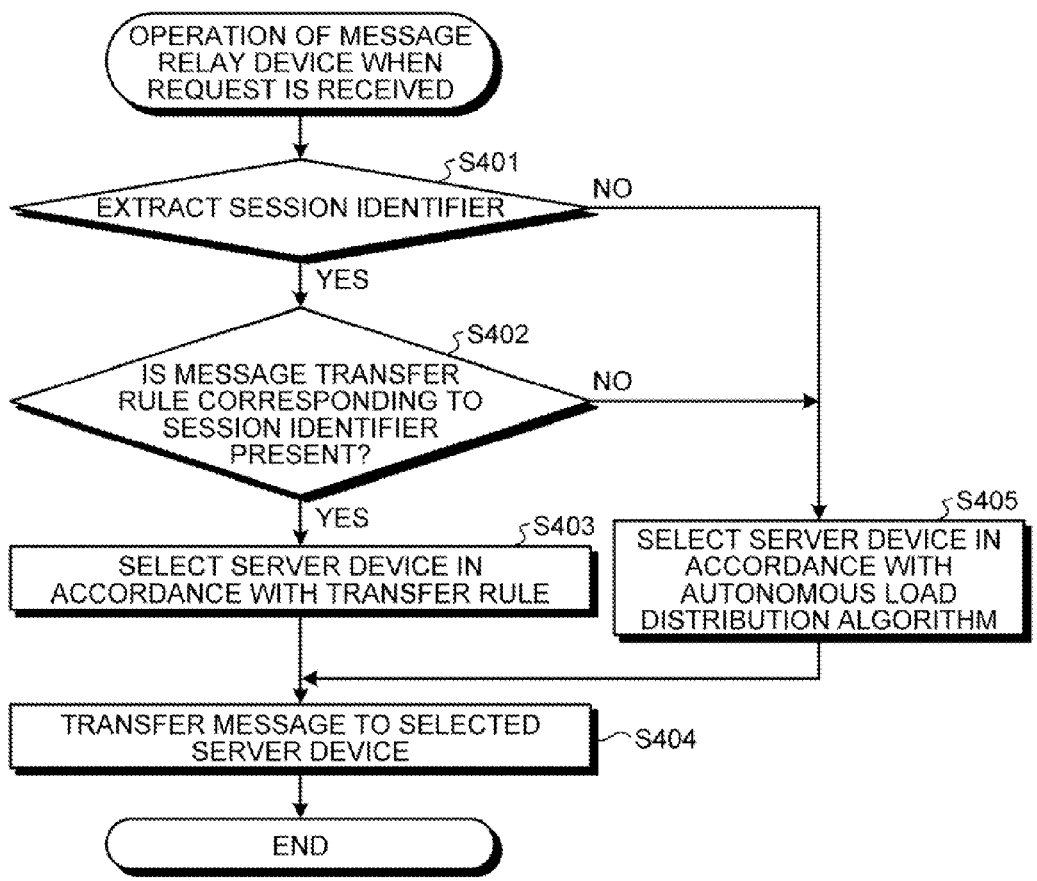
FIG. 28 is a flowchart illustrating the operation of the relay device when a request is received.

In the following, the flow of the operation of the relay device when a request is received will be described using FIG. 28. FIG. 28 is a flowchart illustrating the operation of the relay device when a request is received.

As illustrated in FIG. 28, the message determining unit 33a in the relay device 30 receives the request message sent from the load balancing apparatus 20 and determines whether the request message contains the session identifier (Step S401). For example, by referring to the message content portion of the received request message, the message determining unit 33a determines whether the "session identifier" is present.

If the message determining unit 33a extracts the "session identifier" (Yes at Step S401), the first distribution unit 33b determines whether a transfer rule corresponding to the extracted "session identifier" is present (Step S402). For example, by searching the transfer rule table 32a using the extracted "session identifier" as a key, the first distribution unit 33b determines whether a transfer rule corresponding to the extracted "session identifier" is present.

If a transfer rule corresponding to the extracted "session identifier" is present (Yes at Step S402), the first distribution unit 33b specifies, in accordance with the transfer rule, a server device 40 (Step S403) and sends the received request message to the server device 40 (Step S404). Specifically, the first distribution unit 33b converts the destination value of the packet header of the received message to the IP address of the server device 40. Furthermore, the first distribution unit 33b converts the destination value of the L2 header of the received message to the MAC address of the server device 40 that is specified from the ARP table 2 using the IP address of the server device 40 as a key.

Furthermore, the first distribution unit 33b converts a source value of the L2 header of the received message to the MAC address of the relay device 30 that sends the message. The first distribution unit 33b also converts a source value of the packet header of the received message to the IP address of the relay device 30 that sends the message.

As illustrated in FIG. 29, the message created in this way has, for example, an L2 header, a packet header, a protocol header, and a message content portion. In the L2 header, the MAC address of the relay device 30 serving as the source MAC address and the MAC address of the server device 40 serving as the destination MAC address are described. In the packet header, the IP address and port number of the relay device 30 are described as the source IP address and port number, and the IP address and the port number of the server device 40 are described as the destination IP address and port number. Furthermore, in the protocol header, the path control identifier is described. In the message content portion, the data main body of the request message and the session identifier are described. FIG. 29 is a schematic diagram illustrating an example of a message sent to the server device after session establishment.

In contrast, if the message does not contain the "session identifier" (No at Step S401), the second distribution unit 33c selects, in accordance with an autonomous load distribution algorithm, a server device 40 for load balancing and sends the received request message to the server device 40 (Step S405). If a transfer rule corresponding to the extracted "session identifier" is not present (No at Step S402), the same process is also performed.

In a similar manner as in FIG. 29, the message that is sent at this time is a message in which the destination value and the source value of the packet header are converted and the destination value and the source value of the L2 header of the message are converted. As illustrated in FIG. 30, FIG. 30 differs from FIG. 29 in that the path control identifier is not described in the protocol header and the session identifier is not described in the message content portion. FIG. 30 is a schematic diagram illustrating an example of a message sent to the server device before session establishment.

Operation of the Server Device when a Request is Received

In the following, the flow of the operation of the server device when a request is received will be explained using to FIG. 31. FIG. 31 is a flowchart illustrating the operation of the server device when a request is received.

As illustrated in FIG. 31, the application providing unit 43b in the server device 40 determines whether the session identifier is contained in the message content portion of the request message received from the relay device 30 (Step S501).

If the message contains the session identifier (Yes at Step S501), the application providing unit 43b executes an application related to that session (Step S502) and sends a reply to the client device (Step S503).

Specifically, by referring to the session table 42a using the extracted session identifier as a key, the application providing unit 43b obtains session data and creates a reply indicating that a process using the session data has been executed. Furthermore, the application providing unit 43b converts the destination value of the packet header to the IP address of the relay device 30 obtained from the source value of the packet header of the message illustrated in FIG. 29. Then, the application providing unit 43b converts, using the IP address of the relay device 30 as a key, the destination value of the L2 header of the message illustrated in FIG. 29 to the MAC address of the relay device 30 that is obtained by referring to the ARP table 4. Furthermore, the application providing unit 43b stores the session identifier and the session data in the message content portion of the message.

As illustrated in FIG. 32, the message created in this way has, for example, an L2 header, a packet header, a protocol header, and a message content portion. In the L2 header, the MAC address of the server device 40 serving as the source MAC address and the MAC address of the relay device 30 serving as the destination MAC address are described. In the packet header, the IP address and the port number of the server device 40 are described as the source IP address and port number, and the IP address and the port number of the relay device 30 are described as the destination IP address and port number. Furthermore, in the message content portion, the data main body of the request message, the session identifier, and session data are described. FIG. 32 is a schematic diagram illustrating an example of a message sent from the server device to the relay device after session establishment.

In contrast, if the session identifier is not contained in the request message (No at Step S501), the application providing unit 43b creates a session, i.e., an application creates session data and then creates a session identifier that is assigned to the data (Step S504).

Thereafter, the session-information notifying unit 43a sends, to the management device 50, session information containing the session identifier, the IP address of the server device 40, and the IP address of the source (load balancing source) relay device (Step S505). Then, after receiving a response from the management device 50 (Yes at Step S506), the session-information notifying unit 43a executes the process of Step S502 and the subsequent process.

Operation of the Management Device when a Session Identifier is Received

Figure 33:
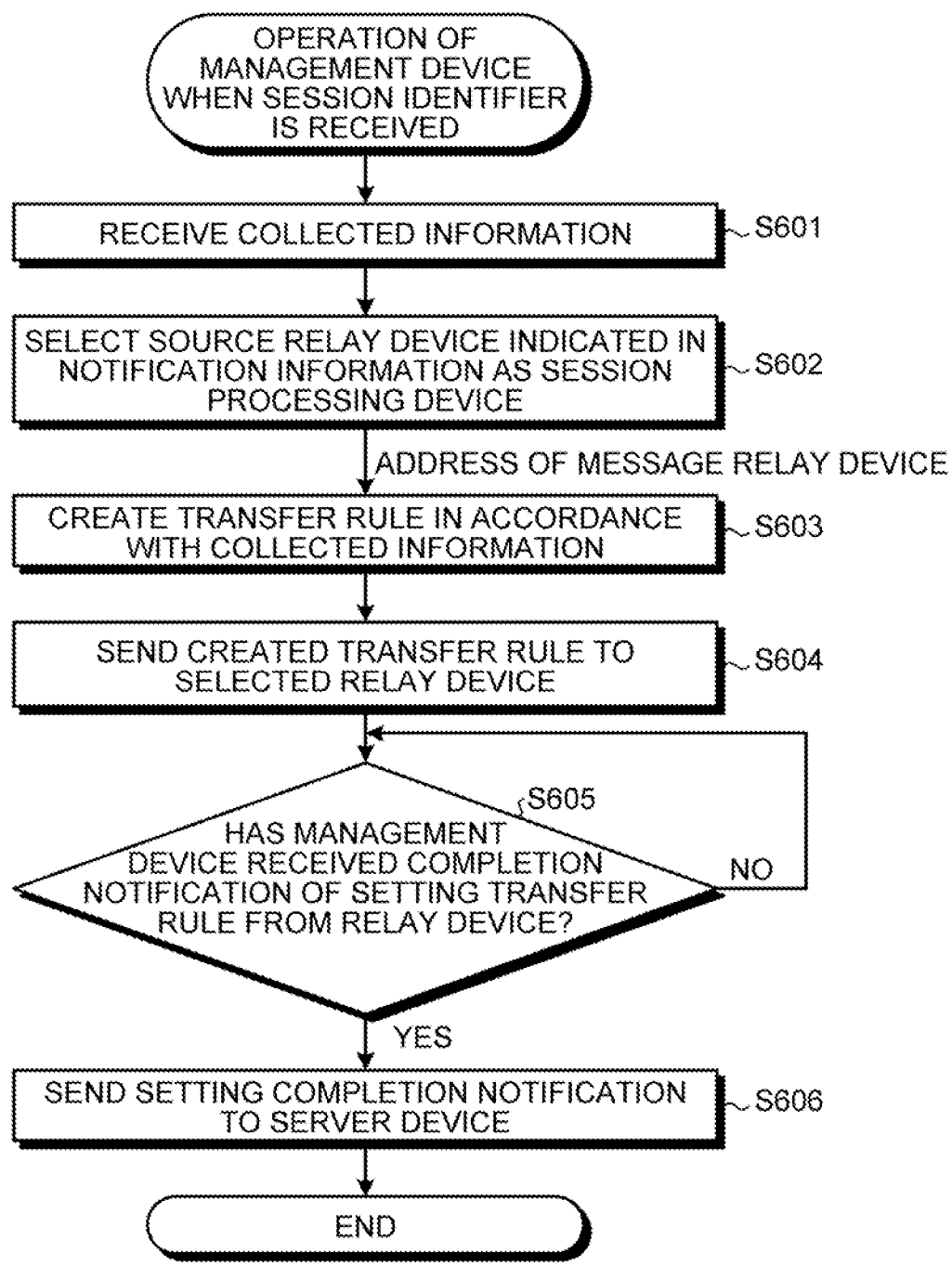
FIG. 33 a flowchart illustrating the operation of the management device when a session identifier is received.

In the following, the flow of the operation of the management device when a session identifier is received will be explained using to FIG. 33. FIG. 33 a flowchart illustrating the operation of the management device when a session identifier is received.

As illustrated in FIG. 33, the session-information receiving unit 53a in the management device 50 receives, form the server device 40, session information (Step S601) and selects a relay device 30 that relays the message (Step S602). Subsequently, the rule creating unit 53b creates a transfer rule (Step S603).

As illustrated in FIG. 34, for example, the session-information receiving unit 53a receives a message in which "a session identifier, a session retaining server address, and a relay device address" are associated. Here, the "session identifier" represents an identifier that is created by the server device 40. The "session retaining server address" represents the IP address of the server device 40 that creates the session identifier. The "relay device address" represents the IP address of the relay device that sends the message to the server device 40.

Then, as illustrated in FIG. 35, the session-information receiving unit 53a creates a transfer rule in which the "session identifier" is associated with the "relay device address". FIG. 34 is a schematic diagram illustrating an example of session information received by the management device 50. FIG. 35 is a schematic diagram illustrating an example of the transfer rule created by the management device 50.

Referring back to FIG. 33, the rule distribution unit 53c sends, to the relay device that is selected and specified at Step S602, the transfer rule created by the rule creating unit 53b (Step S604). For example, as illustrated in FIG. 36, the rule distribution unit 53c sends, to the selected and specified relay device 30, a "setting destination address" indicating the IP address of the relay device 30 to which the transfer rule is sent and a "transfer rule" containing the session identifier and an IP address of a server. FIG. 36 is a schematic diagram illustrating an example of the transfer rule distributed by the management device 50.

Then, if the rule distribution unit 53c receives, from the relay device 30 to which the transfer rule is sent, a completion notification of setting the transfer rule (Yes at Step S605), the rule distribution unit 53c sends, to the server device 40 that is the session information source, the completion notification of the setting (Step S606).

Operation of the Relay Device when a Response is Received

Figures 37, 38:
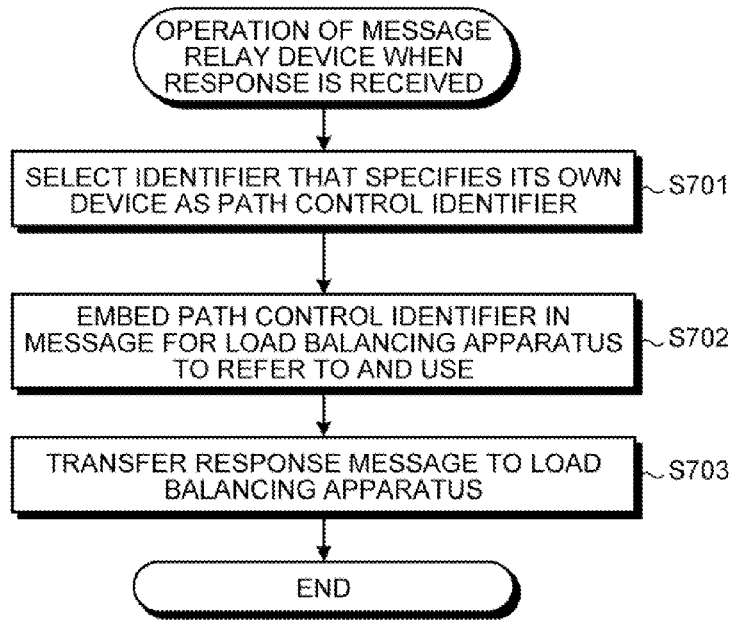
FIG. 37 is a flowchart illustrating the operation of the relay device when a response is received.
FIG. 38 is a schematic diagram illustrating an example of a message in which the path control identifier is embedded after session establishment.

Subsequently, the flow of the operation of the relay device when a response is received will be explained using to FIG. 37. FIG. 37 is a flowchart illustrating the operation of the relay device when a response is received.

As illustrated in FIG. 37, the message replying unit 33e in the relay device 30 selects the relay device 30 used as a path for the message sent from the client device (Step S701). Then, the message replying unit 33e creates a reply message in which the path control identifier that passes through the relay device 30 is embedded in an area to which the load balancing apparatus 20 can refers (Step S702) and sends the reply message to the load balancing apparatus 20 (Step S703).

For example, the message replying unit 33e arbitrarily creates a path control identifier formed from a character string and embeds it in the protocol header area (cookie) in the message illustrated in FIG. 32. Specifically, as illustrated in FIG. 38, the message replying unit 33e creates a message by embedding the path control identifier in the protocol header of the message illustrated in FIG. 32. For each area in FIG. 38, the same information as that illustrated in FIG. 32 is embedded; therefore, a description thereof in detail is not repeated here. FIG. 38 is a schematic diagram illustrating an example of a message in which the path control identifier is embedded after session establishment.

Thereafter, the message replying unit 33e extracts, from the packet header in FIG. 38, "the source IP address and port number, and the destination IP address and port number" as information that specifies a connection. Subsequently, the message replying unit 33e searches, using the extracted information specifying the connection as a key, the connection table 32c in order to specify a connection that is stored when the request message is sent. Then, the message replying unit 33e writes the specified connection information in the packet header of the message illustrated in FIG. 38. Furthermore, the message replying unit 33e searches, using the destination IP (IP-CL) of the rewritten packet header as a key, the rewritten ARP table 3, obtains the MAC address (MAC-SLB) of the load balancing apparatus 20, and rewrites the destination MAC address of the L2 header to a MAC-SLB. The message replying unit 33e sends the created reply message to the load balancing apparatus 20.

As illustrated in FIG. 39, the message created in this way has, for example, an L2 header, a packet header, a protocol header, and a message content portion. In the L2 header, the MAC address of the relay device 30 serving as the source MAC address and the MAC address of the load balancing apparatus 20 serving as the destination MAC address are described. In the packet header, the IP address and the port number of the relay device 30 are described as the source IP address and port number, and the IP address and the port number of the client device 10 are described as the destination IP address and port number. Furthermore, in the protocol header, the path control identifier is described. In the message content portion, the data main body of the request message, the session identifier, and session data are described. FIG. 39 is a schematic diagram illustrating an example of a message sent from the relay device to the load balancing apparatus after session establishment.

Operation of the Load Balancing Apparatus when a Response is Received

In the following, the flow of the operation of the load balancing apparatus when a response is received will be explained using to FIG. 40. FIG. 40 is a flowchart illustrating the operation of the load balancing apparatus when a response is received.

As illustrated in FIG. 40, the autonomous learning unit 23c in the load balancing apparatus 20 receives the request message from the relay device 30 and extracts, from that message, the "path control identifier" (Step S801). For example, the autonomous learning unit 23c extracts the "path control identifier" from a cookie in the protocol header of the received request message.

Then, the autonomous learning unit 23c determines whether a transfer rule corresponding to the extracted "path control identifier" is present (Step S802). For example, the autonomous learning unit 23c searches, using the extracted "path control identifier" as a key, the transfer rule table 22b to determine whether a transfer rule corresponding to the extracted "path control identifier" is present.

If a transfer rule corresponding to the extracted "path control identifier" is present (Yes at Step S802), the autonomous learning unit 23c updates an existing transfer rule using the newly received transfer rule (Step S803). Then, the autonomous learning unit 23c sends, to the client device 10, the reply message received from the relay device 30 (Step S804).

In contrast, if a transfer rule corresponding to the extracted "path control identifier" is not present (No at Step S802), the autonomous learning unit 23c stores, in the transfer rule table 22b, the received transfer rule as a new entry (Step S805). Then, the autonomous learning unit 23c sends, to the client device 10, the reply message received from the relay device 30 (Step S804).

For example, the autonomous learning unit 23c converts source values of the L2 header and the packet header illustrated in FIG. 39 to values for its own load balancing apparatus 20. Furthermore, the autonomous learning unit 23c searches, using the destination value of the packet header serving as the IP address of the client device as a key, the ARP table 2 in order to specify the MAC address of the client device 10. Then, the autonomous learning unit 23c converts the destination value of the L2 header illustrated in FIG. 39 to the MAC address of the client device 10.

As illustrated in FIG. 41, the message created in this way has, for example, an L2 header, a packet header, a protocol header, and a message content portion. In the L2 header, the MAC address of the load balancing apparatus 20 serving as the source MAC address and the MAC address of the client device 10 serving as the destination MAC address are described. In the packet header, the IP address and the port number of the load balancing apparatus 20 are described as the source IP address and port number, and the IP address and the port number of the client device 10 are described as the destination IP address and port number are described. Furthermore, in the protocol header, the path control identifier is described. In the message content portion, the data main body of the request message and the session identifier are described. FIG. 41 is a schematic diagram illustrating an example of a message sent from the load balancing apparatus to the client device after session establishment.

Operation of the Client Device when a Reply is Received

In the following, the flow of the operation of the client device when a reply is received will be explained using to FIG. 42. FIG. 42 is a flowchart illustrating the operation of the client device when a response is received.

As illustrated in FIG. 42, by referring to the protocol header of the reply message received from the load balancing apparatus 20, the application execution unit 13a in the client device 10 determines whether the path control identifier is contained in the reply message (Step S901).

Then, if the path control identifier is contained in the reply message (Yes at Step S901), the application execution unit 13a obtains the path control identifier from the reply message and stores it in the cookie table 12a (Step S902). In contrast, if the path control identifier is not contained in the reply message (No at Step S901), the application execution unit 13a executes the process at Step S903 by skipping the process at Step S902.

Furthermore, by referring to the message content portion of the reply message received from the load balancing apparatus 20, the application execution unit 13a determines whether a session identifier is contained in the reply message (Step S903).

If a session identifier is contained (Yes at Step S903), the application execution unit 13a obtains the session identifier from the reply message and stores it in the application session identification table 12b (Step S904). In contrast, if a session identifier is not contained (No at Step S903), the application execution unit 13a ends its process.

Operation of the Relay Device when a Transfer Rule is Set

Figure 43:
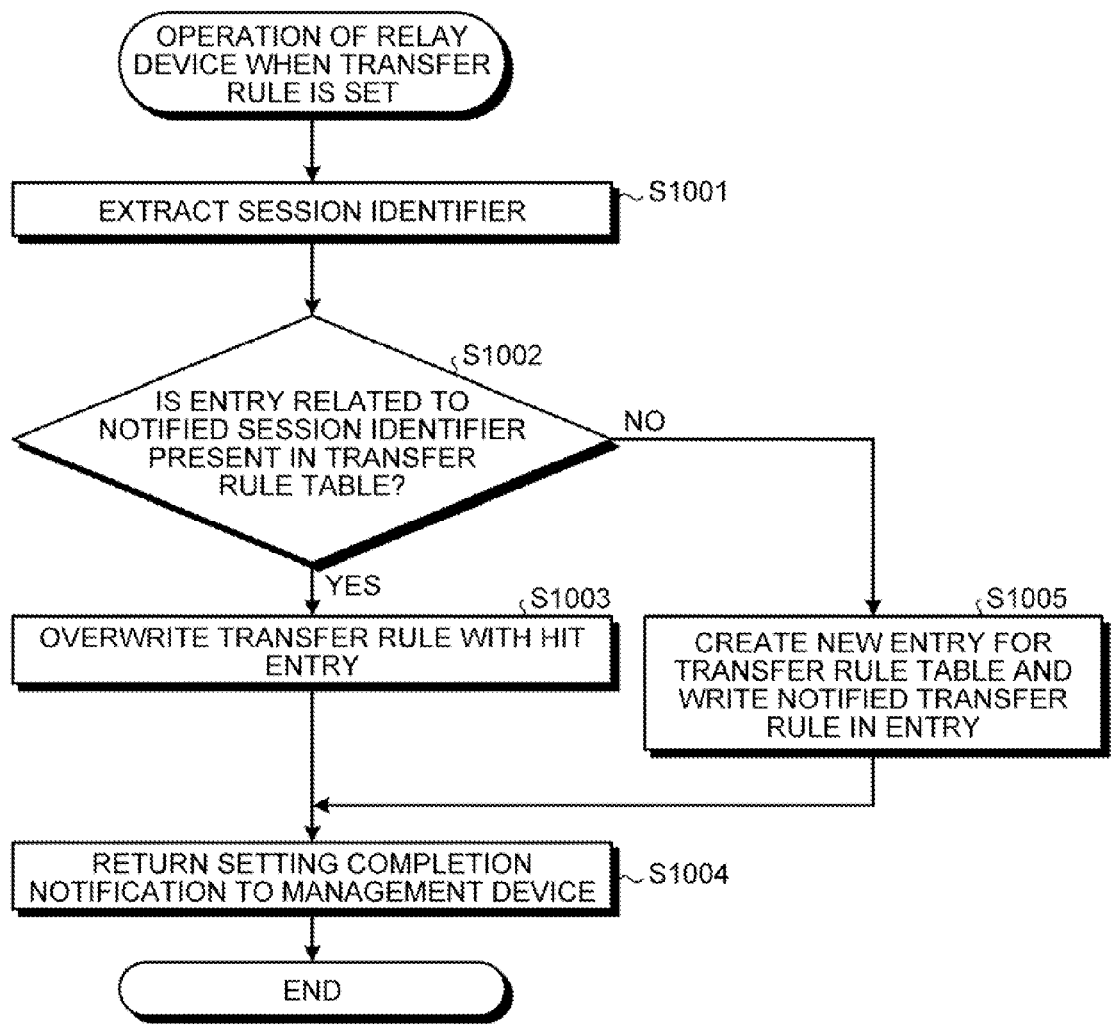
FIG. 43 is a flowchart illustrating the operation of the relay device when the transfer rule is set.

In the following, the flow of the operation of the relay device when a transfer rule is set will be explained using to FIG. 43. FIG. 43 is a flowchart illustrating the operation of the relay device when the transfer rule is set.

As illustrated in FIG. 43, the transfer-rule storing unit 33d in the relay device 30 receives a request message from the management device 50 (see FIG. 36) and extracts, from that message, the "session identifier" (Step S1001). For example, the transfer-rule storing unit 33d extracts the "session identifier" from the message content portion of the received request message.

Then, the transfer-rule storing unit 33d determines whether a transfer rule corresponding to the extracted "session identifier" is present (Step S1002). For example, the transfer-rule storing unit 33d searches, using the extracted "session identifier" as a key, the transfer rule table 32a and determines whether a transfer rule corresponding to the extracted "session identifier" is present.

If a transfer rule corresponding to the extracted "session identifier" is present (Yes at Step S1002), the transfer-rule storing unit 33d updates an existing transfer rule using the transfer rule contained in the received message (Step S1003). Then, the transfer-rule storing unit 33d sends, to the management device 50, a completion notification of the setting (Step S1004).

In contrast, if a transfer rule corresponding to the extracted "session identifier" is not present (No at Step S1002), the transfer-rule storing unit 33d stores, in the transfer rule table 32a, the transfer rule contained in the received message as a new entry (Step S1005). Then, the transfer-rule storing unit 33d sends, to the management device 50, a completion notification of the setting (Step S1004).

Advantages of First Embodiment

As described above, according to the first embodiment, only a single relay device 30 sets a transfer rule; therefore, the number of times a transfer rule is set is low. Furthermore, it is possible to significantly reduce a standby time because the standby time occurs only when a single relay device 30 sets a transfer rule. Thus, it is possible to prevent degradation of response performance with respect to the client device while guaranteeing uniqueness.

Furthermore, according to the first embodiment, when compared with a method of guaranteeing uniqueness by delivering, to N relay devices 30 arranged in parallel, a transfer rule for guaranteeing uniqueness, the number of delivery processes can be reduced to 1/N because the transfer rule for setting is delivered to only one destination. This effect increases as the number N of relay devices 30 arranged in parallel increases. Furthermore, as a related effect on a system, because the load on delivery of a transfer rule for setting is reduced to 1/N, setting processing that can be performed, per unit time, by a server having a given processing capacity increases by a factor of N times. Accordingly, a reduction in the number of servers needed for setting processing with respect to the desired system performance can be expected. A reduction in response time to the client device can also be expected as an effect of the reduction in setting times.

[b] Second Embodiment

In the first embodiment, a description is given of a case in which the transfer rule is created on the basis of information that the load balancing apparatus 20 receives from the relay device 30; however, the configuration is not limited thereto. For example, the load balancing apparatus 20 can be configured to receive the transfer rule from the management device 50 and stores it.

Accordingly, in a second embodiment, a case in which the load balancing apparatus 20 receives the transfer rule from the management device 50 and stores it will be described. In the second embodiment, a description will be given of the configuration of a relay device 30 and a management device 50, which have different functions from those in the first embodiment, and of a processing sequence according to the second embodiment.

Configuration of the Relay Device

Figure 44:
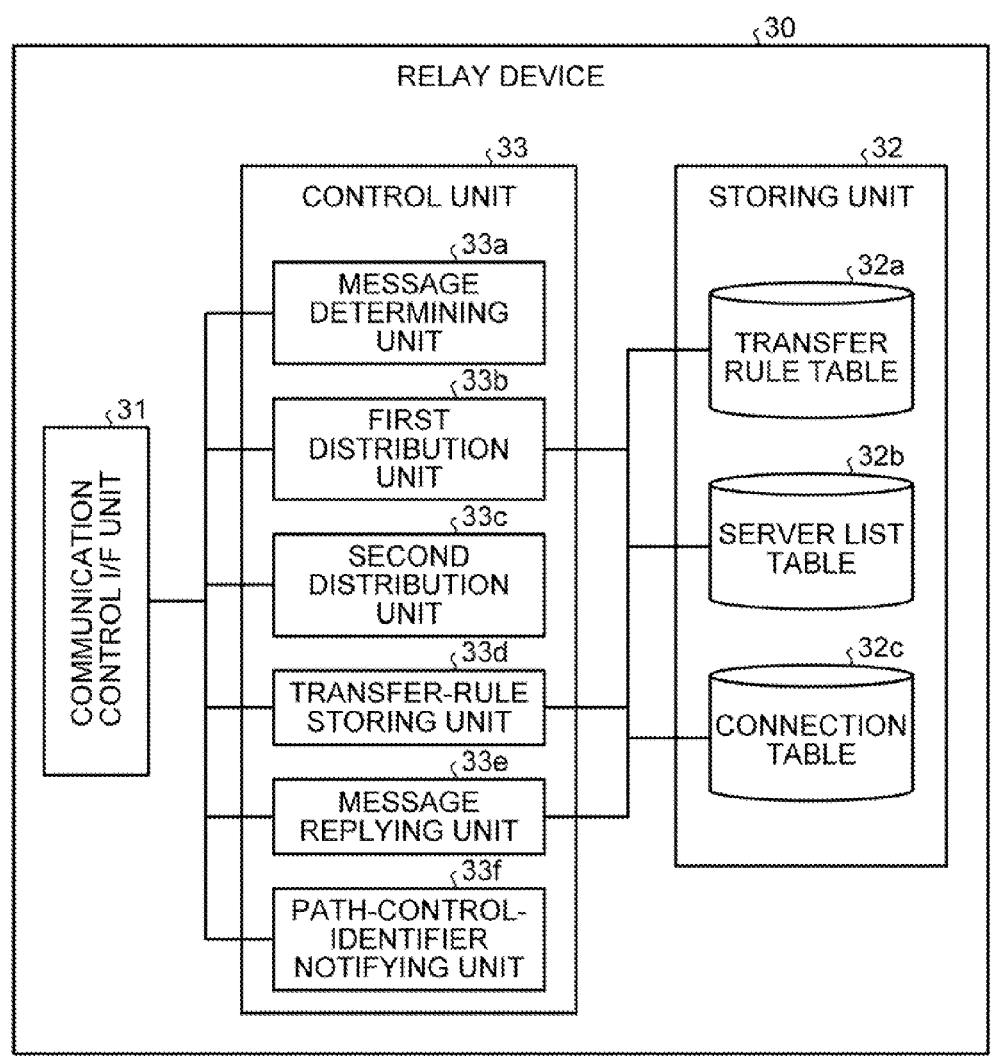
FIG. 44 is a block diagram illustrating the configuration of a relay device according to a second embodiment.

As illustrated in FIG. 44, the relay device 30 includes the communication control I/F unit 31, the storing unit 32, and the control unit 33. In the second embodiment, a description is given of a path-control-identifier notifying unit 33f that has a different function from its function in the first embodiment. Because the other functions are the same as in the first embodiment, a description thereof is omitted. FIG. 44 is a block diagram illustrating the configuration of a relay device according to a second embodiment.

The path-control-identifier notifying unit 33f sends, to the management device 50, the path control identifier created by the message replying unit 33e. Specifically, the path-control-identifier notifying unit 33f sends, to the management device 50, the path control identifier that is created by the message replying unit 33e by associating the identifier with the IP address of the relay device 30, which is part of the path-control-identifier notifying unit 33f.

Configuration of the Management Device

Figure 45:
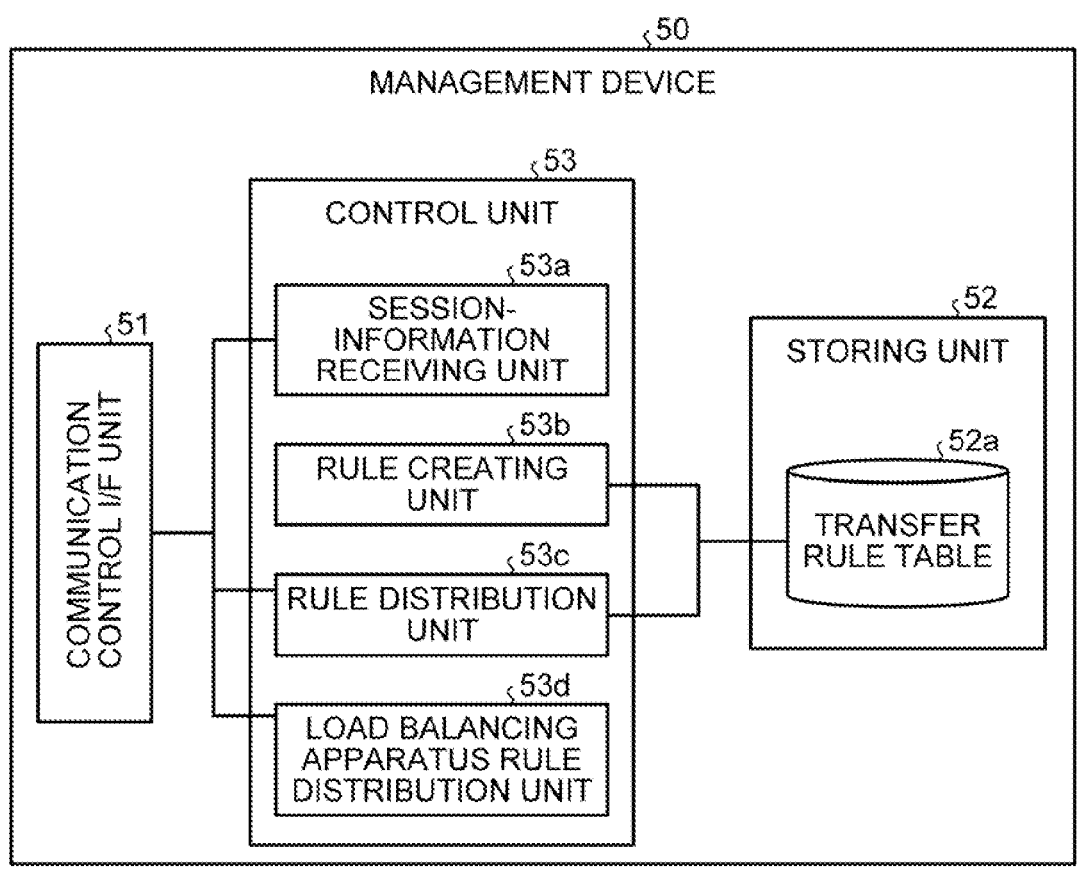
FIG. 45 is a block diagram illustrating the configuration of a management device according to the second embodiment.

As illustrated in FIG. 45, the management device 50 includes the communication control I/F unit 51, the storing unit 52, and the control unit 53. In the second embodiment, a description is given of a load balancing apparatus rule distribution unit 53d that has a different function from its function in the first embodiment. Because the other functions are the same as the first embodiment, a description thereof is omitted. FIG. 45 is a block diagram illustrating the configuration of a management device according to the second embodiment.

The load balancing apparatus rule distribution unit 53d creates a transfer rule that is used by the load balancing apparatus 20 and sends the transfer rule. Specifically, the load balancing apparatus rule distribution unit 53d creates a transfer rule in which the path control identifier that is sent from the path-control-identifier notifying unit 33f in the relay device 30 is associated with the IP address of the relay device 30 and sends it to the load balancing apparatus 20. Then, the load balancing apparatus rule distribution unit 53d receives, from the load balancing apparatus 20, a setting completion and sends, to the IP address of the received relay device 30, a completion notification of the setting.

Processing Sequence

Figure 46:
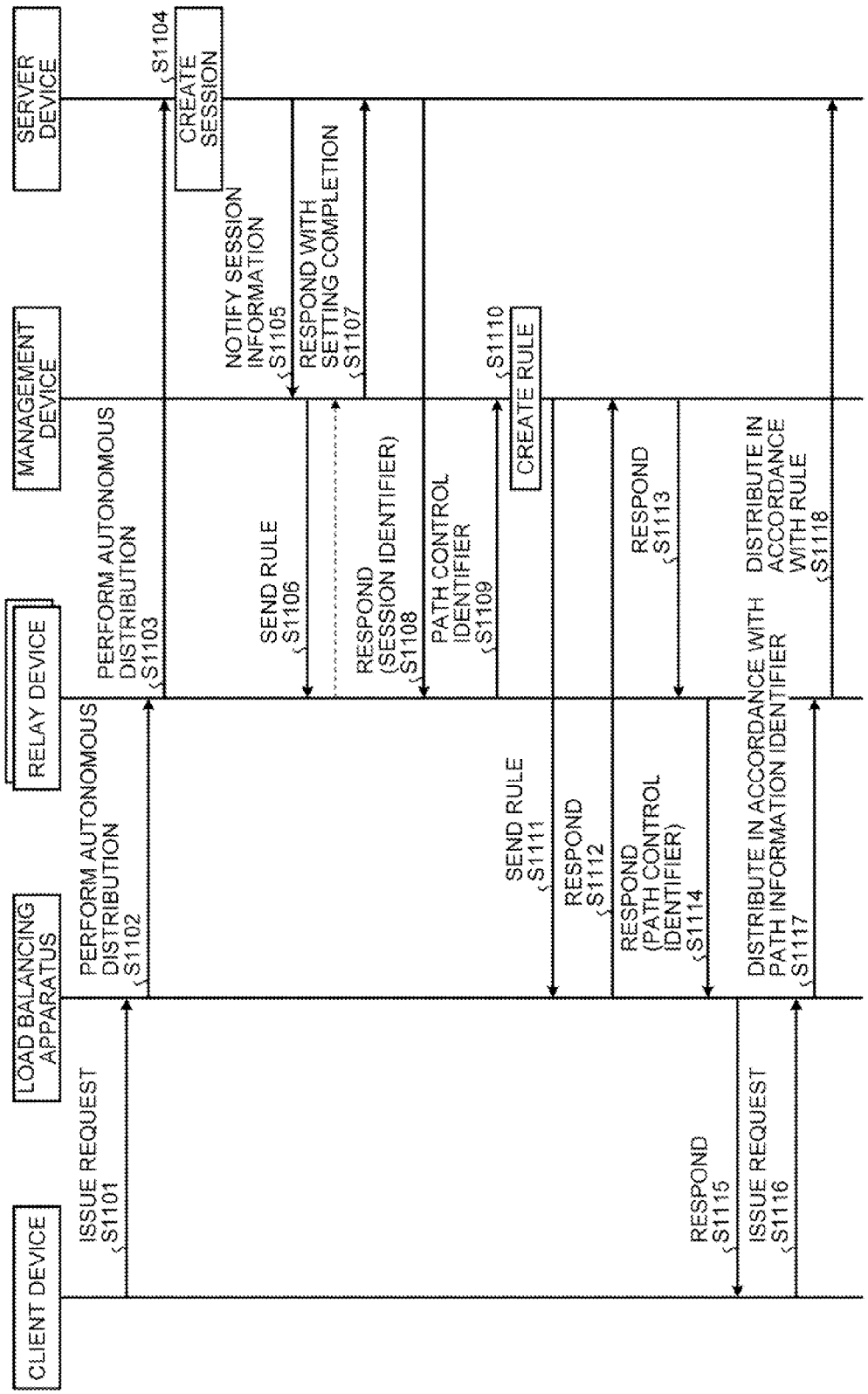
FIG. 46 is a schematic diagram illustrating a processing sequence performed by a system according to the second embodiment.

In the following, a processing sequence performed by a system according to the second embodiment will be explained using to FIG. 46. FIG. 46 is a schematic diagram illustrating a processing sequence performed by a system according to the second embodiment.

As illustrated in FIG. 46, processes from Steps S1101 to S1108 are the same as those from Steps S101 to S108, which are described in the first embodiment; therefore, a description thereof will be omitted.

Steps S1110 to S1115 differ from the first embodiment. Specifically, the path-control-identifier notifying unit 33f in the relay device 30 sends, to the management device 50, the path control identifier created by the message replying unit 33e (Step S1109).

Subsequently, the load balancing apparatus rule distribution unit 53d in the management device 50 creates a transfer rule in which the path control identifier that is sent from the path-control-identifier notifying unit 33f in the relay device 30 is associated with the IP address of the relay device 30 (Step S1110). Then, the load balancing apparatus rule distribution unit 53d sends the created transfer rule to the load balancing apparatus 20 (Step S1111).

The load balancing apparatus 20 stores the transfer rule received from the management device 50 in the transfer rule table 22b and sends, to the management device 50, a completion response indicating that the storing process has been completed (Step S1112). The load balancing apparatus rule distribution unit 53d in the management device 50 sends, to the relay device 30, a completion response indicating that the transfer rule for the load balancing apparatus has been completed (Step S1113).

Then, the relay device 30 sends, to the load balancing apparatus 20, a reply message in which the path control identifier that identifies the path for the message sent from the client device 10 is embedded (Step S1114). The load balancing apparatus 20 sends the received message to the client device 10 (Step S1115).

The subsequent processes performed at Steps S1116 to S1118 are the same as those performed at Steps S111 to S113, which are described in the first embodiment; therefore, a description thereof will be omitted.

Advantage of the Second Embodiment

As described above, according to the second embodiment, because the load balancing apparatus 20 does not need to create a transfer rule in an autonomous manner, it is possible to reduce the processing load on the load balancing apparatus 20 which has a high possibility of becoming a bottleneck, thus further expecting to reduce the response time to the client device.

[c] Third Embodiment

In the first and the second embodiments, a case in which the relay device 30 creates the path control identifier is described; however, the configuration is not limited thereto. For example, the management device 50 can creates the path control identifier by specifying a relay device that becomes a path for the message.

Accordingly, in a third embodiment, a case in which the management device 50 creates the path control identifier by specifying a relay device that becomes a path for the message will be described. In the third embodiment, a description will be given of the configuration of a relay device 30 and a management device 50, which have different functions from those in the first embodiment, and of a processing sequence according to the third embodiment.

Configuration of the Relay Device

Figures 47, 48:
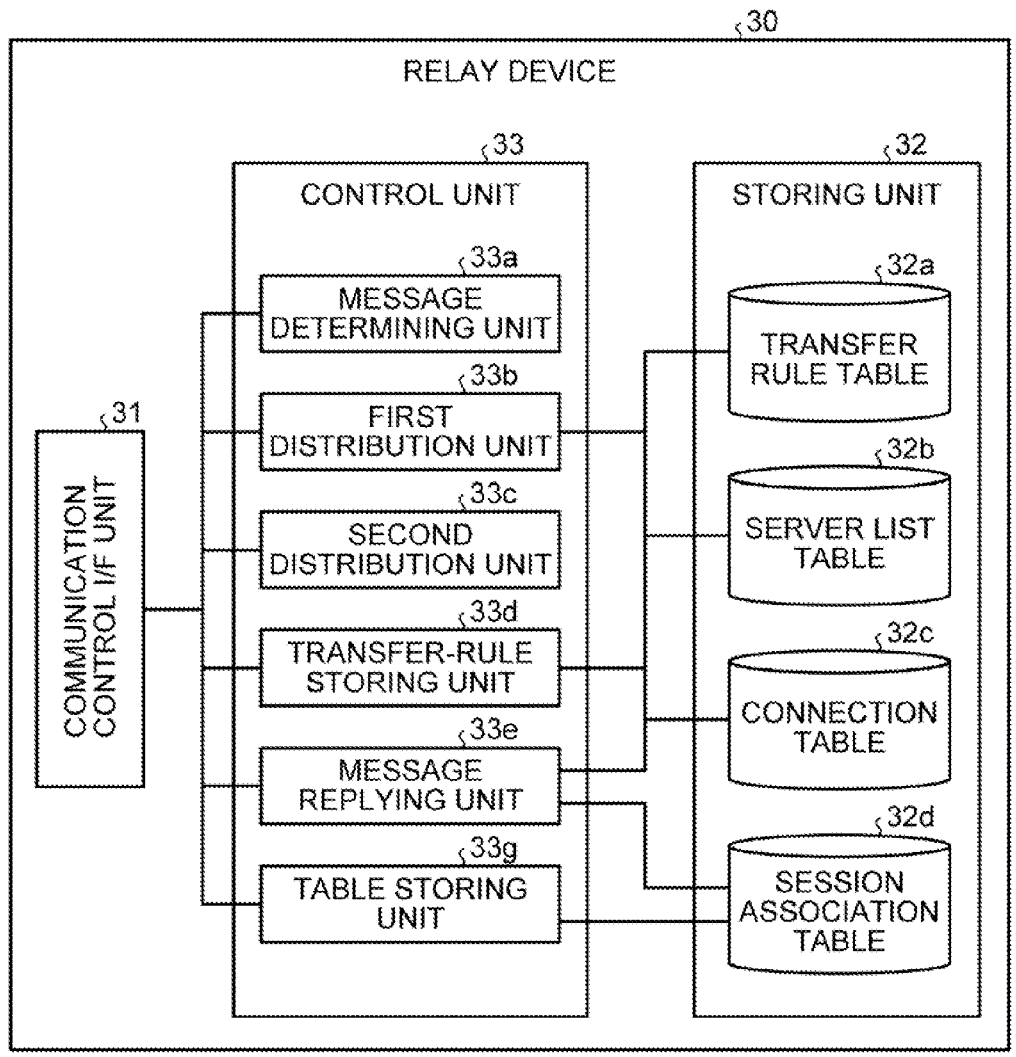
FIG. 47 is a block diagram illustrating the configuration of a relay device according to a third embodiment.
FIG. 48 is a schematic diagram illustrating an example of information stored in a session association table 32d.

As illustrated in FIG. 47, the relay device 30 includes the communication control I/F unit 31, the storing unit 32, and the control unit 33. In the third embodiment, a description is given of a session association table 32d and a table storing unit 33g that have different functions from those in the first embodiment. Because the other functions are the same as the first embodiment, a description thereof is omitted. FIG. 47 is a block diagram illustrating the configuration of the relay device according to a third embodiment.

The session association table 32d stores therein, in an associated manner, the session identifier and the path control identifier that are sent from the management device 50. As illustrated in FIG. 48, the session association table 32d stores therein, for example, "S00001 and K00001" or "S00002 and Kaaaaa" as a "session identifier and path control identifier". FIG. 48 is a schematic diagram illustrating an example of information stored in the session association table 32d.

The table storing unit 33g stores, in an associated manner in the session association table 32d, the session identifier and the path control identifier that are received from the management device 50. Unlike the first embodiment, if the message replying unit 33e receives a reply message from the server device 40, the message replying unit 33e extracts, from that reply message, the session identifier. Then, the message replying unit 33e obtains, from the session association table 32d, the path control identifier corresponding to the extracted session identifier and sends it to the load balancing apparatus 20 by embedding it in the reply message.

Configuration of the Management Device

Figure 49:
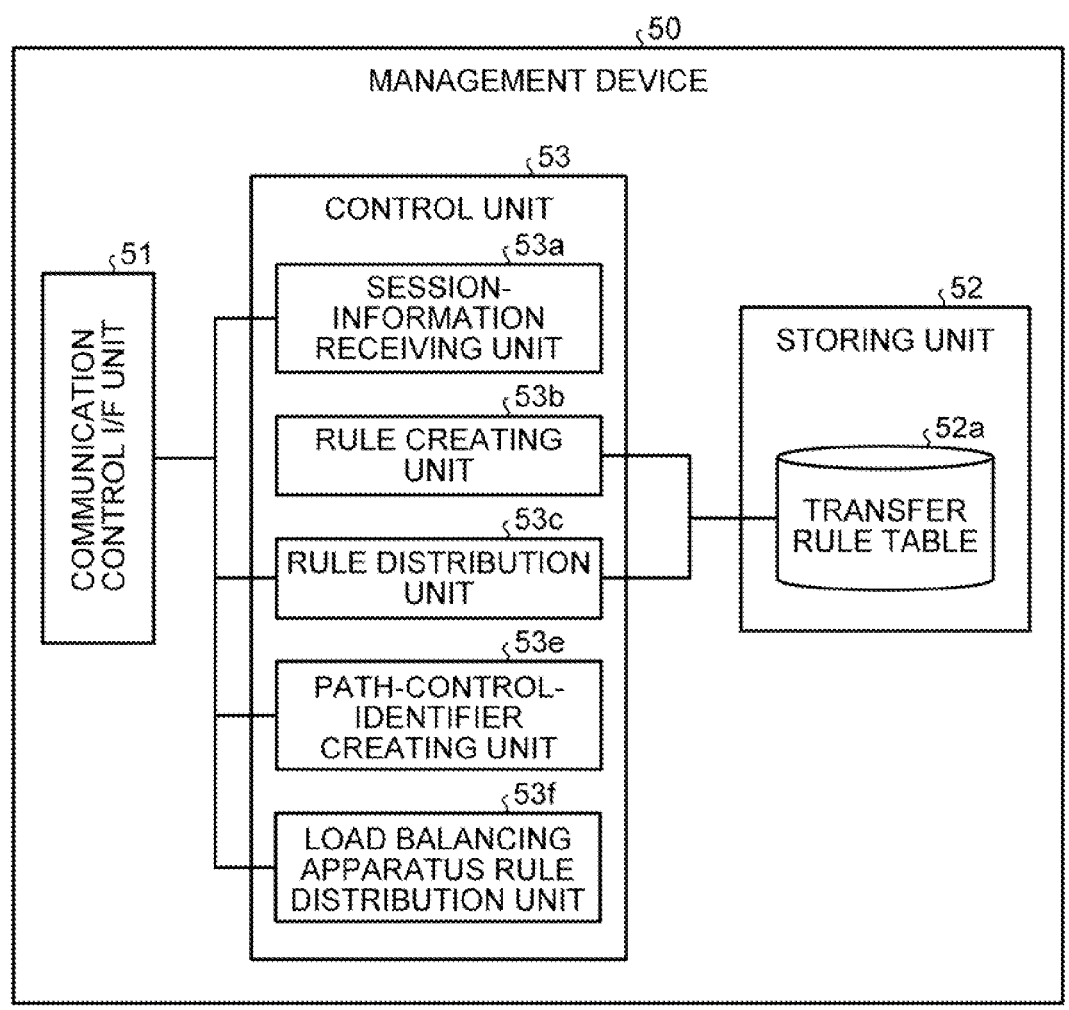
FIG. 49 is a block diagram illustrating the configuration of a management device according to the third embodiment.

As illustrated in FIG. 49, the management device 50 includes the communication control I/F unit 51, the storing unit 52, and the control unit 53. In the third embodiment, a description is given of a path-control-identifier creating unit 53e and a load balancing apparatus rule distribution unit 53f that have different functions from those in the first embodiment. Because the other functions are the same as the first embodiment, a description thereof is omitted. FIG. 49 is a block diagram illustrating the configuration of the management device according to the third embodiment.

The path-control-identifier creating unit 53e specifies, in accordance with, for example, an autonomous distributed algorithm such as a round robin algorithm, a relay device 30 that serves as the destination of a message and creates a path control identifier that is used to specify the specified relay device 30. Then, the path-control-identifier creating unit 53e sends, to the specified relay device 30, the message by associating the created path control identifier with the session identifier received from the server device 40. Alternatively, instead of using an autonomous distributed algorithm, it specifies, for example, the relay device that sends the message to the server device 40 as the destination device. In such a case, information on the relay device is obtained from the server device to which the message is sent. For other cases, the path-control-identifier creating unit 53e stores, in an associated manner, host names and IP addresses of relay devices.

The load balancing apparatus rule distribution unit 53f creates a transfer rule that is used by the load balancing apparatus 20. Specifically, the load balancing apparatus rule distribution unit 53f creates a transfer rule in which the path control identifier created by the path-control-identifier creating unit 53e is associated with the IP address specified in accordance with the host name of the relay device 30 that is specified by the path-control-identifier creating unit 53e. Then, the load balancing apparatus rule distribution unit 53f sends, to the load balancing apparatus 20, the created transfer rule. Thereafter, the load balancing apparatus rule distribution unit 53f receives, from the load balancing apparatus 20, the completion of the setting and sends, to the IP address of the received relay device 30, a completion notification of the setting.

Processing Sequence

Figure 50:
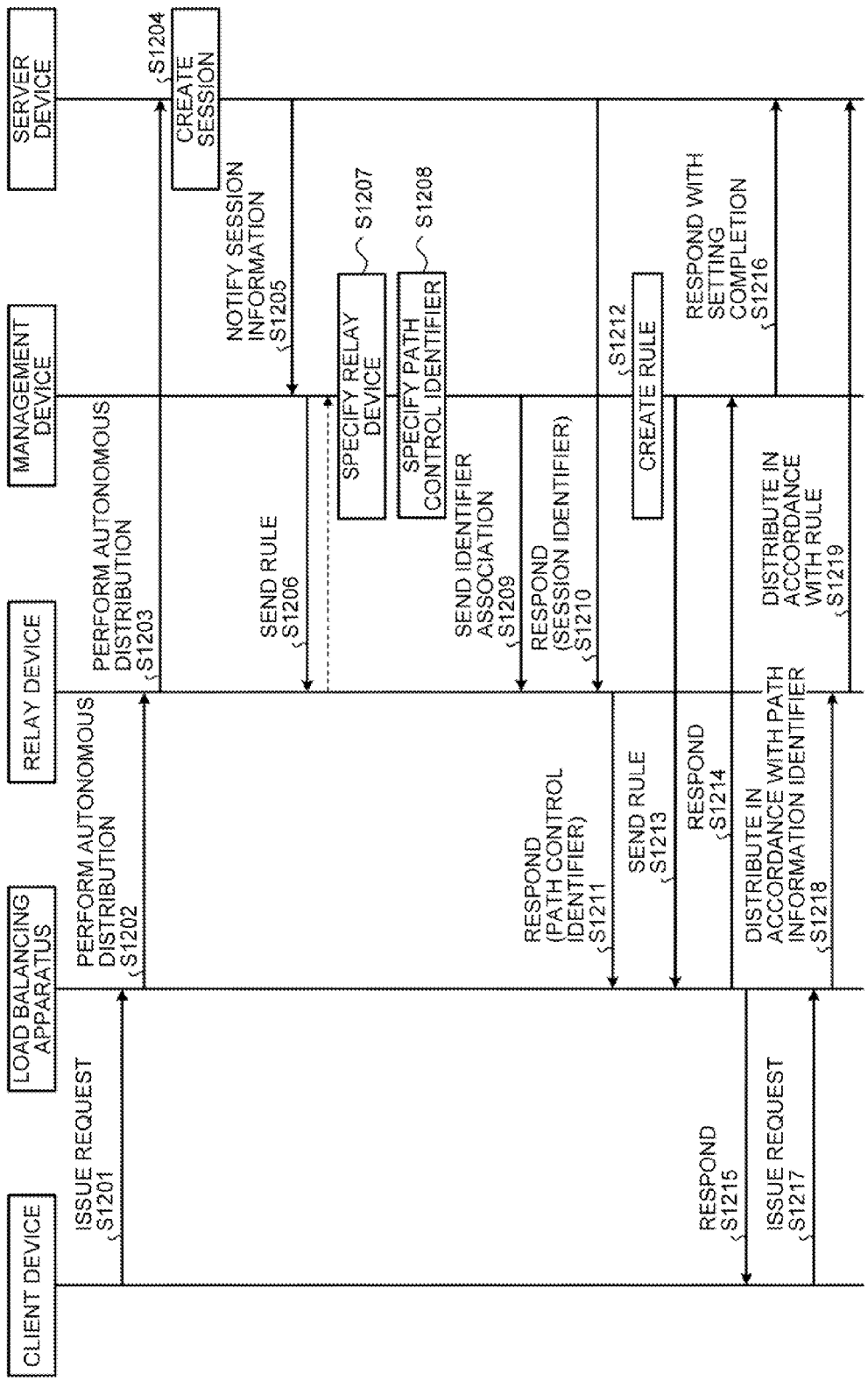
FIG. 50 is a schematic diagram illustrating a processing sequence performed by a system according to the third embodiment.
Figure 51:
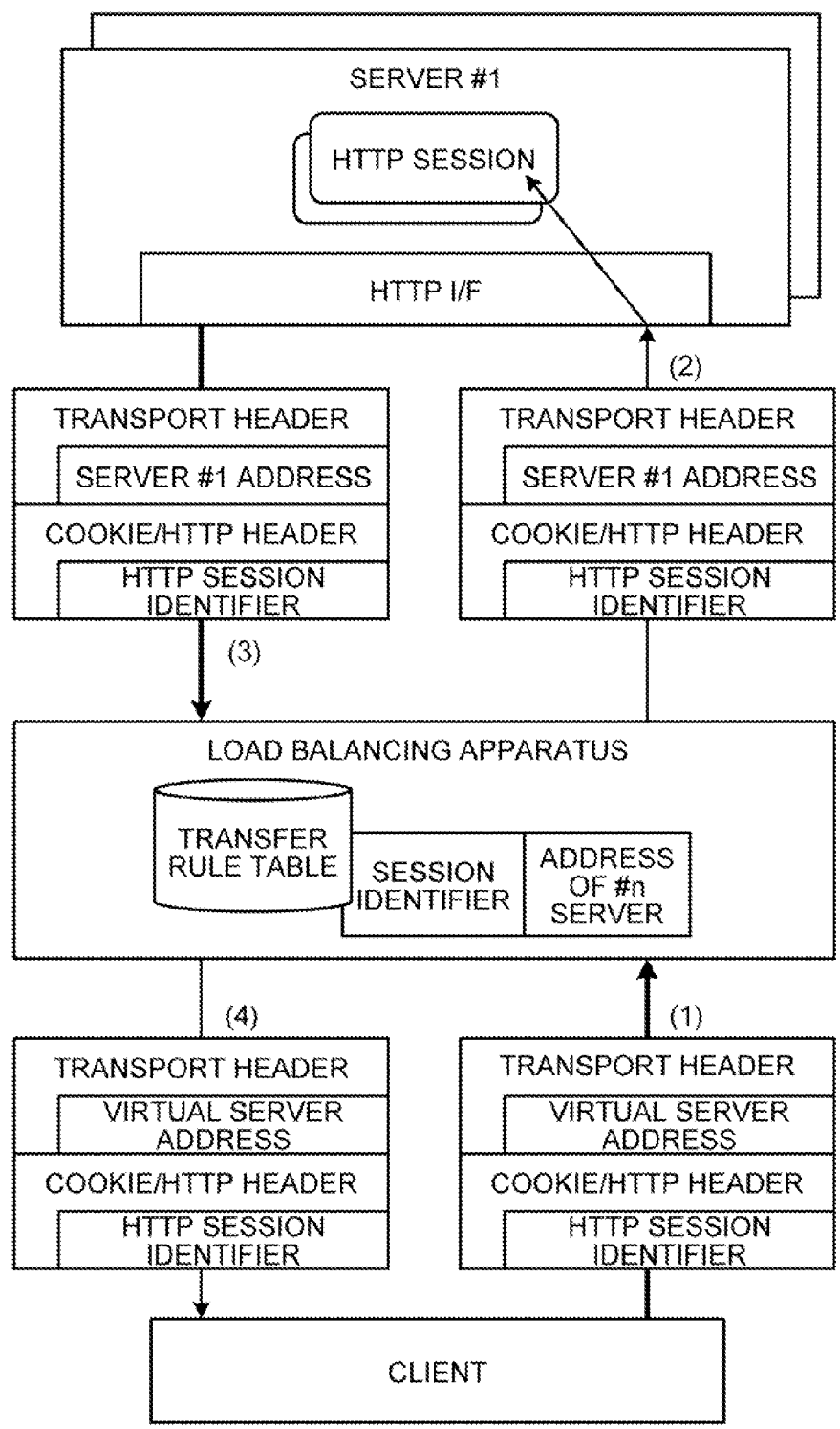
FIG. 51 is a schematic diagram explaining uniqueness guarantee when load balancing is preformed on a server.
Figure 52:
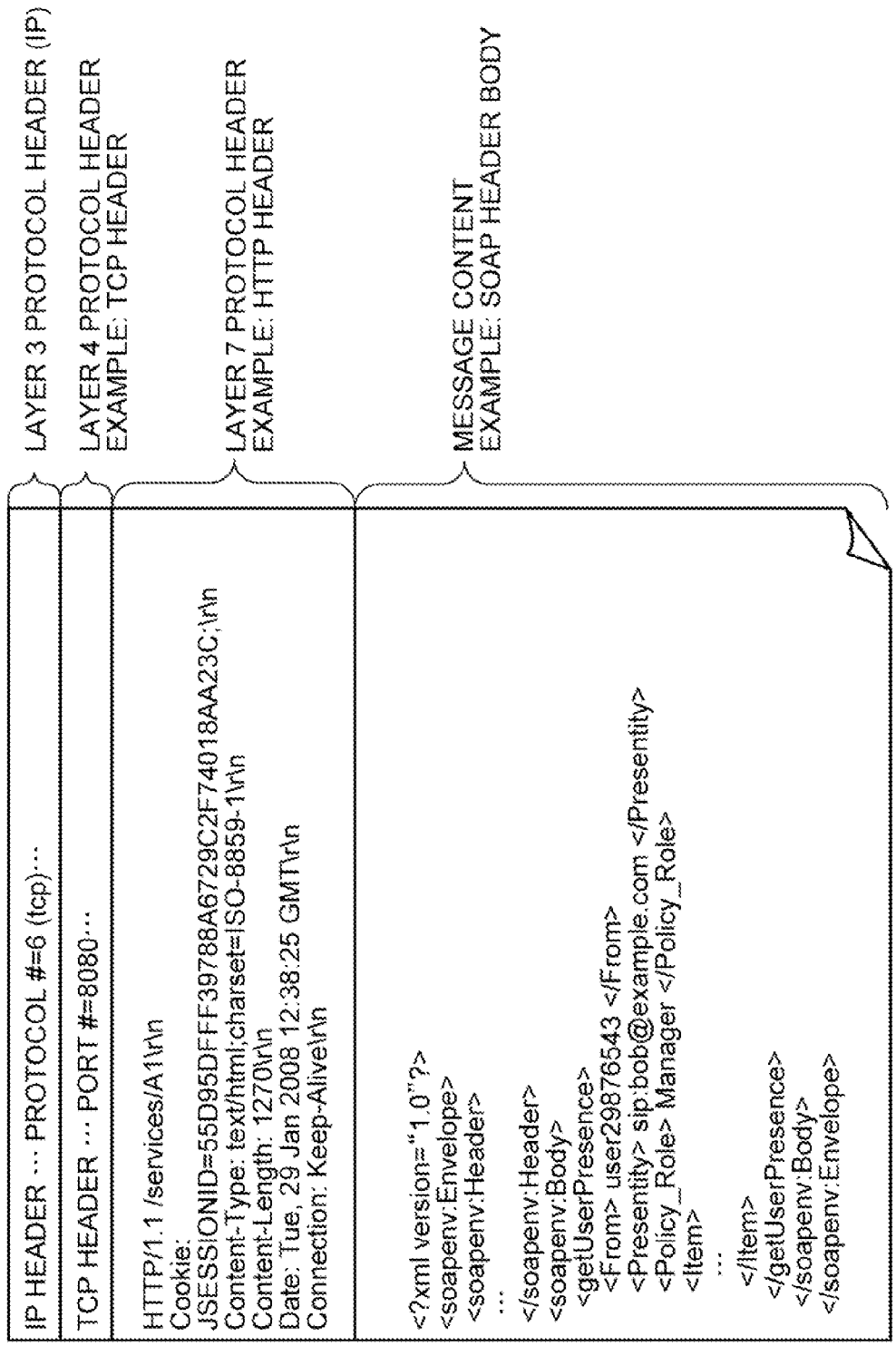
FIG. 52 is a schematic diagram illustrating an example of a SOAP message.
Figure 53:
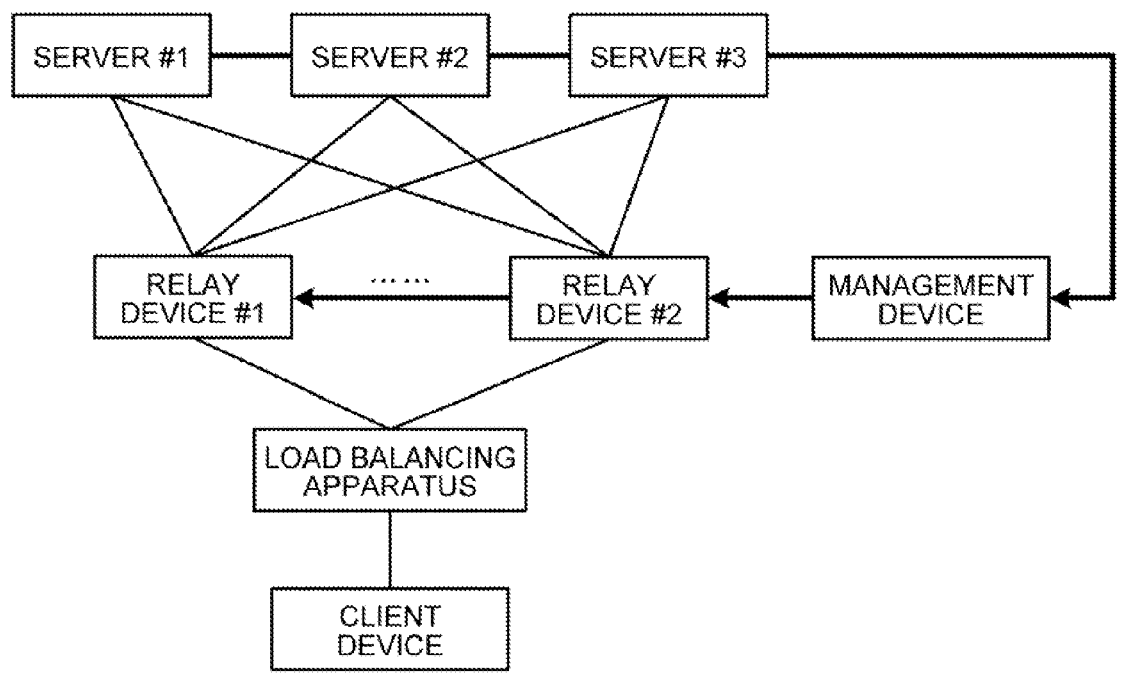
FIG. 53 is a schematic diagram explaining a conventional technology.

In the following, a processing sequence performed by a system according to the third embodiment will be explained using to FIG. 50. FIG. 50 is a schematic diagram illustrating the processing sequence performed by a system according to the third embodiment.

As illustrated in FIG. 50, processes from Steps S1201 to S1206 are the same as those from Steps S101 to S106, which are described in the first embodiment; therefore, a description thereof will be omitted.

Steps S1207 to S1216 differ from the first embodiment. Specifically, the management device 50 in the path-control-identifier creating unit 53e specifies, in accordance with a predetermined condition, a relay device 30 that serves as the destination of the message (Step S1207). Subsequently, the path-control-identifier creating unit 53e creates a path control identifier for specifying the specified relay device 30 (Step S1208).

Then, the path-control-identifier creating unit 53e associates the created path control identifier with the session identifier received from the server device 40 and sends it to the specified relay device 30 (Step S1209).

Thereafter, the session-information notifying unit 43a in the server device 40 embeds the session identifier in the message content portion of the reply message with respect to the received request message and sends the reply message to the IP address of the relay device 30 (Step S1210).

The message replying unit 33e in relay device 30 obtains, from the session association table 32d, a path control identifier corresponding to the session identifier extracted from the reply message, embeds it in the reply message, and sends it to the load balancing apparatus 20 (Step S1211).

The load balancing apparatus rule distribution unit 53f in the management device 50 creates a transfer rule in which the path control identifier is associated with the IP address of the relay device 30 that is specified by the path-control-identifier creating unit 53e (Step S1212). Then, the load balancing apparatus rule distribution unit 53f sends the created transfer rule to the load balancing apparatus 20 (Step S1213).

The load balancing apparatus 20 stores, in the transfer rule table 22b, the transfer rule received from the management device 50 and sends, to the management device 50, a completion response indicating that a storing process has been completed (Step S1214). Furthermore, the load balancing apparatus 20 sends, to the client device 10, the message received at Step S1211 (Step S1215).

Then, the management device 50 sends, to the server device 40, a completion reply indicating that the relay device 30 has stored the transfer rule or a completion reply indicating that the transfer rule for the load balancing apparatus has been delivered (Step S1216).

The subsequent processes performed at Steps S1217 to S1219 are the same as those performed at Steps S111 to S113, which are described in the first embodiment; therefore, a description thereof will be omitted.

Advantage of the Third Embodiment

As described above, in the third embodiment, because the load balancing apparatus 20 does not need to create a transfer rule in an autonomous manner, it is possible to reduce the processing load on the load balancing apparatus 20, which has a high possibility of becoming a bottleneck. Furthermore, the relay device also does not need to create a transfer rule nor a path control identifier. Accordingly, when compared with the first and second embodiments, a further reduction in the response times to the client device can be expected.

[d] Fourth Embodiment

The embodiments of the present invention have been described; however, the embodiment is not limited thereto and can be implemented with various kinds of embodiments other than the embodiments described above. Therefore, another embodiment will be described below.

Path Control Identifier

In the first, second, and third embodiments, a case is described in which a path control identifier that is formed from a character string is arbitrarily created; however, the configuration is not limited thereto. For example, it is also possible to use, as a path control identifier, network information on a relay device, such as an IP address, a URL, or a MAC address of the relay device.

Information on the Relay Device

In the first, second, and third embodiments, an IP address, which is associated with a path control identifier, is used as information on the relay device; however, the configuration is not limited thereto. For example, it is also possible to use an URL together with name resolution.

System Configuration, etc.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. Furthermore, all or any part of the processing functions performed by each device can be implemented as hardware by wired logic or can be implemented by a CPU or programs analyzed and executed by the CPU.

Of the processes described in the embodiments, the whole or a part of the processes that are mentioned as being automatically performed can be manually performed, or the whole or a part of the processes that are mentioned as being manually performed can be automatically performed using known methods. Furthermore, process procedures, the control procedures, the specific names, and the information containing various kinds of data or parameters indicated in the above specification and drawings can be arbitrarily changed unless otherwise noted.

Programs

The load distributing method, the message relaying method, and the transfer rule management method described in the embodiments can be implemented by a program prepared in advance and executed by a computer such as a personal computer or a workstation. The program can be sent using a network such as the Internet. Furthermore, the programs are stored in a non-transitory computer-readable recording medium, such as a hard disk, a flexible disk (FD), a compact disk read only memory (CD-ROM), a magneto-optical (MO) disk, and a digital versatile disk (DVD). The computer then reads and executes the program from the above.

According to an aspect of a load balancing apparatus, a load balancing method, and a load balancing program disclosed in the present invention, it is possible to prevent degradation of response performance with respect to a client while guaranteeing uniqueness.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A load balancing apparatus comprising:
a list storing unit that stores therein a relay device list table containing addresses of relay devices on which load balancing is performed by the load balancing apparatus;
a rule storing unit that stores therein a load balancing apparatus transfer rule in which a path control identifier for identifying a session between a client device and a relay device that distributes a message to a server device is associated with relay device information for specifying the relay device, included in the relay device list table, that creates the path control identifier;

an identifier determining unit that determines, when the message is received from the client device, whether the path control identifier is contained in the message;

a first distribution unit that specifies, when the identifier determining unit determines that the path control identifier is contained, relay device information that is associated with the path control identifier from the load balancing apparatus transfer rule stored in the rule storing unit and then sends the message to the relay device that is specified by the specified relay device information; and a second distribution unit that sends, when the identifier determining unit determines that the path control identifier is not contained, the message to the specified relay device in accordance with a predetermined condition.

2. The load balancing apparatus according to claim 1, further comprising:

a reply receiving unit that receives, from the relay device after the second distribution unit sends the message, a reply message containing the path control identifier as a response to the message; and a rule learning unit that transfers, to the client device, the reply message received by the reply receiving unit, creates the load balancing apparatus transfer rule in which the path control identifier contained in the reply message is associated with relay device information obtained from the reply message, and stores the load balancing apparatus transfer rule in the rule storing unit.

3. The load balancing apparatus according to claim 2, wherein the rule learning unit receives, from a management device, the load balancing apparatus transfer rule and stores the load balancing apparatus transfer rule in the rule storing unit, the management device creating a relay device transfer rule in which a session identifier, which identifies a session between the client device and the server device to which the message sent from the client device is sent via the relay device, is associated with server information, which specifies the server device to which the message is sent.

4. The load balancing apparatus according to claim 3, wherein the rule learning unit receives, from the management device, the load balancing apparatus transfer rule that is created using the path control identifier, which is received by the management device from the relay device, and using relay device information, which specifies the relay device, and then stores the load balancing apparatus transfer rule in the rule storing unit.

5. The load balancing apparatus according to claim 3, wherein the rule learning unit receives, from the management device, a load balancing apparatus transfer rule created by using relay device information, which specifies the relay device that is specified by the management device in accordance with a predetermined condition, and using a path control identifier, which specifies a path for the relay device, and then stores the load balancing apparatus transfer rule in the rule storing unit.

6. A load balancing apparatus comprising:

a storing unit that stores therein a relay device list table containing addresses of relay devices on which load balancing is performed by the load balancing apparatus, the storing unit further storing therein a load balancing apparatus transfer rule in which a path control identifier for identifying a session between a client device and a relay device that distributes a message to a server device is associated with relay device information for specifying the relay device, included in the relay device list table, that creates the path control identifier;

a processor executing an operation, the operation comprising:

determining, when a message is received from the client device, whether the path control identifier is contained in the message;

specifying, when the identifier determining unit determines that the path control identifier is contained, relay device information that is associated with the path control identifier from the load balancing apparatus transfer rule stored in the rule storing unit and then sends the message to the relay device that is specified by the specified relay device information; and sending, when the identifier determining unit determines that the path control identifier is not contained, the message to the specified relay device in accordance with a predetermined condition.

7. A load balancing method comprising:

storing a relay device list table containing addresses of relay devices on which load balancing is performed;

determining whether a path control identifier for identifying a session between a client device and a relay device that distributes a message to a server device is contained in a message received from the client device;

specifying, when it is determined that the path control identifier is contained at the determining, from a rule storing unit that stores therein a load balancing apparatus transfer rule in which the path control identifier is associated with relay device information for specifying the relay device, included in the relay device list table, that creates the path control identifier, the relay device information that is associated with the path control identifier and sending the message to the relay device that is specified by the specified relay device information; and sending, when it is determined that the path control identifier is not contained at the determining, the message to the relay device that is specified in accordance with a predetermined condition.

8. A non-transitory computer readable storage medium stored therein a load balancing program causing a computer to execute a process comprising:

storing a relay device list table containing addresses of relay devices on which load balancing is performed;

determining whether a path control identifier for identifying a session between a client device and a relay device that distributes a message to a server device is contained in a message received from the client device;

specifying, when it is determined that the path control identifier is contained at the determining, from a rule storing unit that stores therein a load balancing apparatus transfer rule in which the path control identifier is associated with relay device information for specifying the relay device, included in the relay device list table, that creates the path control identifier, the relay device information that is associated with the path control identifier and sending the message to the relay device that is specified by the specified relay device information; and sending, when it is determined that the path control identifier is not contained at the determining, the message to the relay device that is specified in accordance with a predetermined condition.

* * * * *